US012519700B2

United States Patent
Larish et al.

(10) Patent No.: US 12,519,700 B2
(45) Date of Patent: Jan. 6, 2026

(54) METHOD AND SYSTEM FOR VIRTUAL EMULATION AND SELF-ORGANIZING NETWORK CONTROL USING DEEP GENERATIVE MODELS

(71) Applicant: Verizon Patent and Licensing Inc., Basking Ridge, NJ (US)

(72) Inventors: Bryan Christopher Larish, Belmont, MA (US); Said Soulhi, Boston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1228 days.

(21) Appl. No.: 17/324,539

(22) Filed: May 19, 2021

(65) Prior Publication Data

US 2021/0273857 A1 Sep. 2, 2021

Related U.S. Application Data

(63) Continuation of application No. 15/815,088, filed on Nov. 16, 2017, now Pat. No. 11,038,769.

(51) Int. Cl.
| | | |
|---|---|---|
| *H04L 41/14* | (2022.01) | |
| *G06N 3/045* | (2023.01) | |
| *G06N 3/088* | (2023.01) | |
| *G06N 3/10* | (2006.01) | |
| *H04L 41/0894* | (2022.01) | |

(Continued)

(52) U.S. Cl.
CPC ........... *H04L 41/145* (2013.01); *G06N 3/045* (2023.01); *G06N 3/088* (2013.01); *G06N 3/10* (2013.01); *H04L 41/0894* (2022.05); *H04L 43/08* (2013.01); *H04L 43/20* (2022.05); *H04L 41/0895* (2022.05); *H04L 41/40* (2022.05); *H04L 43/50* (2013.01); *H04W 84/18* (2013.01)

(58) Field of Classification Search
CPC ..... H04L 41/145; H04L 41/147; H04L 43/08; H04L 441/0893; H04L 43/50; G06N 3/045; G06N 3/088; G06N 3/10; H04W 84/18
See application file for complete search history.

(56) References Cited

U.S. PATENT DOCUMENTS

| | | | |
|---|---|---|---|
| 2017/0208560 A1* | 7/2017 | Papa | H04W 56/006 |
| 2019/0108448 A1* | 4/2019 | O'Malia | G06N 3/04 |
| 2020/0389371 A1 | 12/2020 | Tedaldi et al. | |

OTHER PUBLICATIONS

"A survey of machine learning techniques applied to self-organizing cellular networks"; Klain et al. ("Klain"), Jul. 2017, pp. 1-41.*

(Continued)

*Primary Examiner* — Sherrod L Keaton

(57) ABSTRACT

A computer device may include a memory configured to store instructions and a processor configured to execute the instructions to train a generator neural network to simulate a network entity using a discriminator neural network that discriminates output associated with the network entity from output generated by the generator neural network. The computer device may be further configured to receive a set of input parameters associated with the simulated network entity; use the generator neural network to generate output for the simulated network entity based on the received set of input parameters; and apply the generated output for the simulated network entity to manage a communication network.

20 Claims, 13 Drawing Sheets

(51) Int. Cl.
    *H04L 43/08*     (2022.01)
    *H04L 43/20*     (2022.01)
    *H04L 41/0895*   (2022.01)
    *H04L 41/40*     (2022.01)
    *H04L 43/50*     (2022.01)
    *H04W 84/18*     (2009.01)

(56) References Cited

OTHER PUBLICATIONS

Creswell, et al., "Generative Adversarial Networks—An overview", IEEE Signal Processing Magazine, Jan. 2018; pp. 53-65 (Year: 2018).

Goodfellow, et al., "Generative Adversarial Nets", Departement d'informatique et de recherche operationnelle, Universite de Montreal, https://arxiv.org/pdf/1406.2661.pdf, pp. 1-9, Jun. 10, 2014.

Hughes, et al., "Generative Adversarial Learning for Machine Learning empowered Self Organizing 5G Networks", 2019 Workshop on Computing, Networking and Communications (CNC); pp. 282-286. (Year: 2019).

Kim, et al., "Learning to Discover Cross-Domain Relations with Generative Adversarial Networks", https://arxiv.org/pdf/1703.05192.pdf, pp. 1-10, May 15, 2017.

Larsen, et al., "Generating Faces with Torch", http://torch.ch/blog/2015/11/13/gan.html, pp. 1-7, Nov. 13, 2015.

Martinez, et al., "Particle Generative Adversarial Networks for full-event simulation at the LHC and their application to pileup description", Journal of Physics: Conference Series 1525 (2020); pp. 1-7. (Year: 2020).

Radford, et al., "Unsupervised Representation Learning with Deep Convolutional Generative Adversarial Networks", Under review as a conference paper at ICLR 2016, https://arxiv.org/pdf/1511.06434.pdf, pp. 1-16, Jan. 7, 2016.

Wang, et al., "Generative Adversarial Networks: Introduction and Outlook", IEEE/CAA Journal of Automaticainica, vol. 4, No. 4, Oct. 2017; pp. 588-598. (Year: 2017).

Zhang, et al., "A Generative Adversarial Learning-Based Approach for Cell Outage Detection in Self-Organizing Cellular Networks", IEEE Wireless Communications Letters, vol. 9, No. 2, Feb. 2020; pp. 171-174. (Year: 2019).

\* cited by examiner

METHOD AND SYSTEM FOR VIRTUAL EMULATION AND SELF-ORGANIZING NETWORK CONTROL USING DEEP GENERATIVE MODELS

CROSS REFERENCE TO RELATED APPLICATIONS

This patent application is a continuation of U.S. patent application Ser. No. 15/815,088, filed on Nov. 16, 2017 and titled "METHOD AND SYSTEM FOR VIRTUAL NETWORK EMULATION AND SELF-ORGANIZING NETWORK CONTROL USING DEEP GENERATIVE MODELS," the contents of which are hereby incorporated by reference in their entirety.

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. The provider may manage a large number of wireless access networks and a particular wireless access network may manage a large number of devices. In order to maintain a quality of service across a network, or across multiple networks, the provider may need to take into account various conditions that vary across networks and/or devices.

DETAILED DESCRIPTION OF PREFERRED EMBODIMENTS

Figure 1:
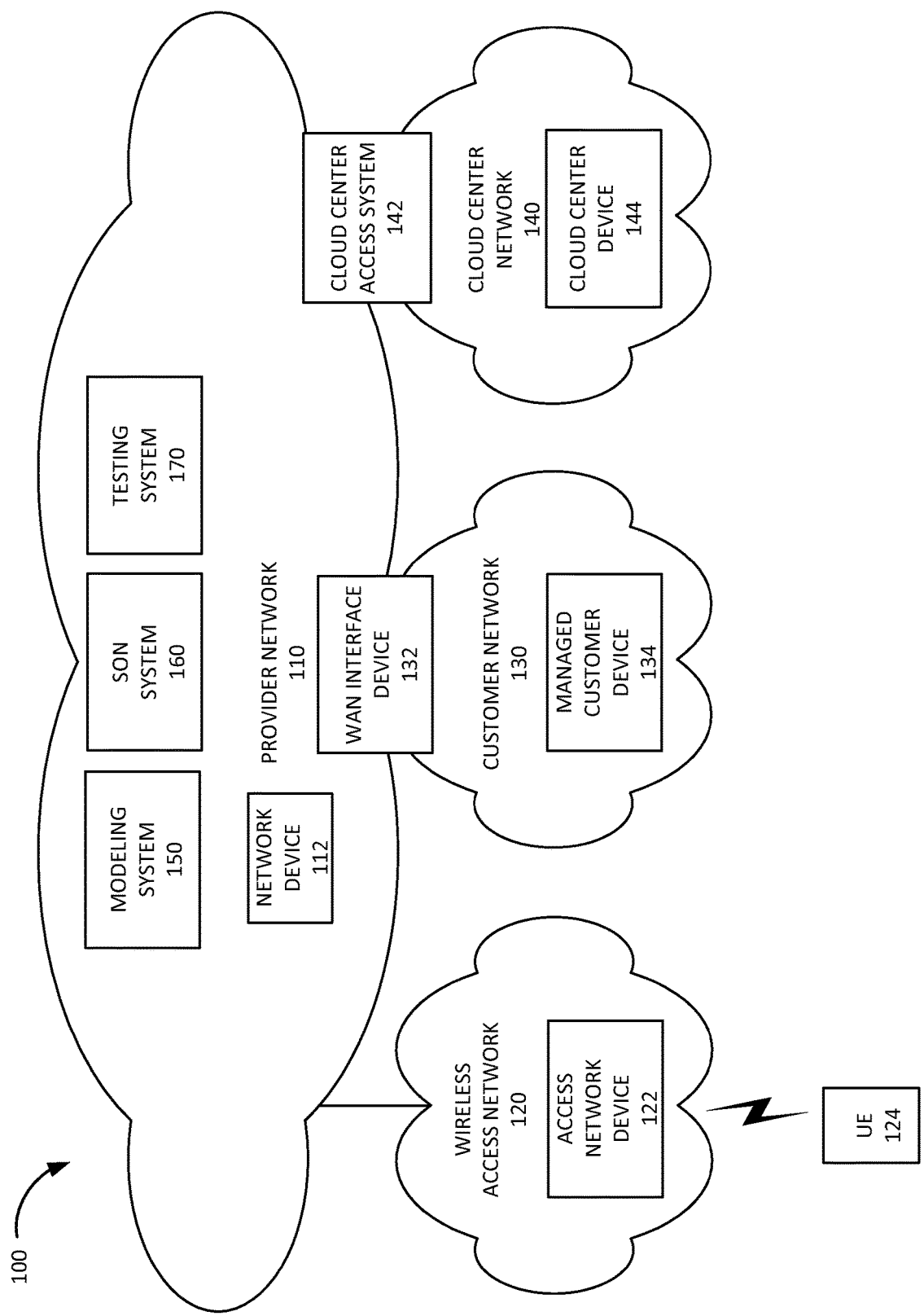
FIG. 1 is a diagram illustrating an environment according to an implementation described herein.

The following detailed description refers to the accompanying drawings. The same reference numbers in different drawings identify the same or similar elements.

As communication networks and services increase in size, complexity, and number of users, management of the communication networks may become increasingly more complicated. A provider of communication services may employ different techniques and strategies to manage a provider network. One strategy may include increasing use of virtualized network functions (VNFs) rather than dedicated hardware to perform particular network functions. VNFs may be deployed, for example, on hardware in a cloud computing center. Examples of devices that may be virtualized may include network nodes, such as, for example, routers, switches, firewalls, network address translation (NAT) devices, and/or gateways; Long Term Evolution (LTE) wireless access network nodes, such as, for example, an eNodeB, a Mobility Management Entity (MME), a Packet Data Network Gateway (PGW), a Serving Gateway (SGW), a Home Subscriber Server (HSS), etc.; Internet Protocol (IP) Multimedia Subsystem (IMS) nodes, such as a Call Session Control Function (CSCF) device or an Application Server (AS) device, etc.; and/or other types of network entities.

In contrast to dedicated specialized hardware, which may be costly, time-consuming to deploy, and/or labor-intensive to manage, network function virtualization (NFV) may enable network entities to be implemented on standardized hardware, resulting in lower deployment and/or maintenance costs, as well as higher flexibility compared to hardware implementations. However, VNFs also provide challenges. For example, VNFs may be provided and/or hosted by third-party developers and may be associated with a high operating cost. Furthermore, such developed VNFs may be difficult to modify, may not be adaptable or be able to learn, and may be unable to discover underlying relationships between configuration and/or workload features in a high-dimensional feature space. Implementations described herein address these challenges.

Another strategy may include increasing use of self-organizing network (SON) functions. In the course of providing communication services, the operating conditions of a provider network may change. As an example, with respect to a wireless access network managed by the provider network, the number of wireless devices attached to a base station may increase and reduce the available capacity of the base station. As another example, a base station may experience fading of wireless signals on particular channels due to changes in the environment. As yet another example, a list of neighboring base stations, referred to as a "neighbor list," may change as base stations are added, removed, or changed. In the past, wireless networks had to be optimized manually in response to such changes.

SON functions have enabled automation of optimization functions for networks and may be deployed at a scale to manage 4G and 5G wireless networks and/or to manage switching and routing in wired electrical or optical networks. For example, SON functions may be used to enable discovery and optimization of base station neighbor lists, modification of antenna tilts or directions to improve coverage or capacity, changes to handoff parameters to reduce handover drops, route optimizations, load balancing of data traffic, and/or other types of parameters that previously required laborious procedures to be executed manually. SON functions may be carried out by obtaining various metrics, also referred to as key performance indicators (KPIs), across a large number of base stations and user equipment (UE) devices and to perform analysis on the obtained metrics. The result of the analysis may indicate a change in one or more parameters of a network node in response to changing conditions.

However, management of SON functions also presents challenges. For example, a SON system may need to be continuously updated to take into account new types of nodes, new types of configurations, new network states, etc. Manual updating of a SON system may be costly and slow. The performance and resource management of VNFs and/or SON functions may be improved through machine learning. Machine learning enables VNF and/or SON systems to learn without human intervention. One type of machine learning system is a neural network. A neural network includes a connection of nodes, sometimes called artificial neurons. Each node receives signals from either an input connection or a connection from another node in a previous layer. A node will fire, or send a signal downstream to a node in a next layer, if the aggregate signals from all the connections to the node are above or below a threshold. A connection from a first node to a second node is associated with a weight that is applied to a signal sent from the first node to the second node. During training of the neural network, the weights of the connections between nodes are continually adjusted based on an output generated by the neural network in order to reduce the error of the output compared to a target output.

Neural networks may be used as a classifier. A classifier receives input data and classifies the input data into one of a set of classes or categories. For example, the classifier may generate an output that includes a set of values corresponding to the set of classes, with each value indicating the likelihood that the input data belongs to a corresponding class. Neural networks trained to function as a classifier may be referred to as discriminator neural networks, because they discriminate input data into a class. Another type of neural network is a generator neural network. A generator neural network is trained to generate data that appears similar to data in a training set in a particular domain (e.g., images, text, speech audio, etc.).

Neural networks may be combined to form a generative adversarial network (GAN). A GAN includes two neural networks that may compete with each other in a zero-sum game. A GAN includes a generator neural network that generates data and a discriminative neural network that is trained using real data to discriminate the real data from the generated data. The discriminative neural network is trained through backpropagation to minimize the error of discriminating the generated data from the real data, while the generator neural network is trained through backpropagation to maximize the error of the discriminative neural network. Over time, the discriminative neural network becomes better at detecting the generated data and the generator neural network becomes better at generating data that is more similar to the real data.

Implementations describe herein relate to virtual network emulation and self-organizing networks (SONs) using deep generative models. A computer device may train a generator neural network to simulate a network entity using a discriminator neural network that discriminates output associated with the network entity from output generated by the generator neural network, receive a set of input parameters associated with the simulated network entity, use the generator neural network to generate output for the simulated network entity based on the received set of input parameters, and apply the generated output for the simulated network entity to manage a communication network.

The training may include training the discriminator neural network to classify output associated with the network entity as real data, training the discriminator neural network to classify output generated by the generator neural network as generated data, and training the generator neural network to maximize an error associated with the discriminator neural network based on predictions made by the discriminator neural network with respect to the output associated with the network entity and the output generated by the generator neural network.

In some implementations, the network entity, simulated by the generator neural network, may include a VNF managed object (MO). An MO may correspond to a virtualized network node. A VNF MO may represent an LTE wireless access network node, such as an eNodeB node, an MME node, an SGW node, a PGW node, an HSS node, a Policy Charging and Rules Function (PCRF) node, an Authentication, Authorization, and Accounting (AAA) node, a Multimedia Broadcast Multicast Service (MBMS) node, a Machine Type Communication (MTC) Interworking Function (IWF) node, a Service Capability Server (SCS) node, an evolved Packet Data Gateway (ePDG) node, and/or another type of network node that may be included in a wireless access network. Furthermore, a VNF MO may represent an IMS node, such as a CSCF node or an AS node. Moreover, a VNF MO may represent a network node managing data traffic in a wired network, such a router, a switch, a firewall, a NAT device, a gateway, and/or another type of network device. Still further, a VNF MO may represent a network node that functions as a controller in an optical network, such as a reconfigurable optical add-drop multiplexer (ROADM) controller.

Each particular type of VNF MO may be associated with a particular generator neural network trained using inputs corresponding to the capabilities, configuration, and workload for a particular VNF MO and the associated outputs corresponding to a particular combination of capabilities, configuration, and workload. The outputs may depend on the type of VNF MO. The outputs may include data plane outputs and/or management plane outputs.

For example, if the VNF MO corresponds to an eNodeB, the capabilities may include the number of cells, the available bands, the number and arrangement of antennas, memory capacity, transmission power capacity, the type of transmission technology (e.g., 1.4 MHz wide enhanced MTC (eMTC) channels (also referred to as category Cat-M1), Low Power Wide Area (LPWA) technology such as Narrow Band (NB) IoT (NB-IoT) technology, etc.), etc.; the configuration may include a selected LTE band, a bandwidth, a downlink center frequency, a mobile country code (MCC), a mobile network code (MNC), a transmitter antenna power gain, a receiver antenna power gain, etc.; and the workload profile may include a total number of user equipment (UE) devices connected to the eNodeB, a number of voice connections associated with the UE devices, a number of video connections associated with the UE devices, a number of handovers within a particular time period associated with the UE devices, a movement speed associated with the UE devices, an elevation associated with the UE devices, data throughputs associated with the UE devices, a packet size variability associated with the UE devices, a variance in packet arrival times associated with the UE devices, a call drop rate associated with the UE devices, latency associated with the UE devices, error rates associated with the UE devices, a signal strength associated with the UE devices, etc.

For each combination of capabilities, configuration, and workload profile, a set of outputs may be generated by a VNF MO that may be compared by the discriminative neural network to a set of outputs generated by the generator neural network. For example, if the VNF MO corresponds to an eNodeB, a set of data plane outputs may include a set of Radio Access Bearers (RABs), assigned by the eNodeB VNF MO to the UE devices serviced by the eNodeB, and the corresponding parameters associated with each RAB. Furthermore, a set of management plane outputs for an eNodeB may include one or more key performance indicators (KPIs), such as, for example, accessibility KPIs (e.g., a Radio Resource Control (RRC) setup success rate, a RAB success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, etc.), and/or other types of KPIs. In some implementations, the same generator neural network may be trained to generate data plane outputs and management plane outputs. In other implementations, a first generator neural network may be trained to generate data plane outputs and a second generator neural network may be trained to generate management plane outputs.

The generator neural network may be trained using a set of inputs and corresponding outputs of a VNF MO until the generator neural network generates a set of outputs that is sufficiently similar to the VNF MO outputs as determined by the discriminative neural network. After the generator neural network is trained, when the computer device determines that a new VNF MO is to be generated, the computer device may determine a configuration for the new VNF MO, estimate a workload for the new VNF MO, and use the generator neural network to simulate the new VNF MO based on the determined configuration and the estimated workload.

Implementations described herein further relate to training a network performance generator neural network to generate a network performance metric using a network performance discriminator neural network that discriminates output generated by the network performance generator neural network from network performance metrics generated by a group of VNF MO generator neural networks. The group of VNF MO generator neural networks may together represent a group of network nodes corresponding to the current configuration of the network. The network performance generator neural network may be used to test a proposed SON action to determine whether the resulting network performance is satisfactory, before the proposed SON action is applied to the network.

For example, a computer device may be configured to receive a proposed SON action to be performed on a network. The proposed SON action may include instructions to change one or more configurations in the nodes of the network in order to improve a coverage optimization parameter, a capacity optimization parameter, a handover parameter, a neighbor list changes parameter, an antenna tilt parameter, a delay optimization parameter, a carrier optimization parameter, a random access channel parameter, and/or another type of SON parameter. The computer device may use the network performance generator neural network to calculate the network performance metric based on the proposed SON action, determine that the calculated network performance metric satisfies a network performance requirement for the network, and apply the proposed SON action to the network, in response to determining that the calculated network performance metric satisfies the network performance requirement for the network.

Implementations described herein further relate to automated testing using GANs. A testing queue of test cases may be used as data to train a testing generator neural network using a discriminator that discriminates the test cases from output generated by the testing generator neural network. The test cases may include particular network configurations that are to be tested by a testing system. Manual generation of test cases may be slow and costly and training a testing generator neural network to automatically generate test cases may reduce the cost and/or time for testing a network.

Implementations described herein further relate to enabling a SON system to perform reinforcement learning using GANs. Reinforcement learning is a type of machine learning in which an agent is trained using a reward function. The agent may perform actions based on a policy that includes a set of stimulus-response rules that map states of the environment to actions to be performed by the agent. A reward function maps states of the environment to reward values and a value function measures the total expected reward accumulated over time starting for a particular state of the environment. Additionally, the agent may have access to a model of the environment that predicts a resultant next state and a corresponding reward value given a current state. The goal of the agent is to maximize the value function over time.

A SON system may be subjected to reinforcement learning by exploring possible courses of action using one or more GANs. For example, a GAN may be trained to generate a network model that predicts possible future states of a network based on a time-series data of previous states, by training a network model generator neural network to simulate a network model using a discriminator neural network that discriminates a network state from a predicted network state generated by the network model generator neural network.

The network performance generator neural network and the network model generator neural network may then be used together to subject a SON system to reinforcement learning. For example, a computer device may receive a predicted network state from the network model generator neural network, receive a proposed SON action based on the predicted network state, and use the network performance generator neural network to calculate the network performance metric based on the predicted future network state and the proposed SON action. The SON system may then update a SON policy database based on the calculated network performance metric, the predicted network state, and the proposed SON action. Thus, should the predicted network state arise in the future, the SON system may be able to determine the reward value of the proposed SON action in response to the predicted network state arising, based on the calculated network performance metric. Thus, the SON system may be able to determine whether selecting the proposed SON action will result in an increased value function for the SON system.

Implementations described herein further relate to performing vector arithmetic on feature vectors associated with particular network configurations to determine a particular network configuration. Particular network configurations may be represented as vectors that are provided as input to a generator neural network. After the generator neural network is trained, the weights of the trained generator neural network may be represented as a tensor. Subsets of the tensor (e.g., rows in a matrix) may correspond to the network configuration vectors and the elements of the subset (e.g., columns in the matrix) may correspond to features of the network configuration vectors in a high dimensional feature space. Thus, the weights of the features of a particular subset, associated with a network configuration vector, may plot the network configuration vector in the high dimensional feature space. Furthermore, the distance between two network configuration vectors in the high dimensional feature space may represent how similar the two network configuration vectors are and vector arithmetic may be used to determine relationships between different network configuration vectors. Thus, implementations described herein further relate to generating one or more feature vectors for network configurations associated with a generator neural network based on weights associated with nodes of the generator neural network and performing vector arithmetic on the one or more feature vectors to determine a particular configuration on the network.

FIG. 1 is a diagram of an exemplary environment 100 in which systems and/or methods, described herein, may be implemented. As shown in FIG. 1, environment 100 may include a provider network 110, a wireless access network 120, a customer network 130, and a cloud center network 140.

Provider network 110 may correspond to a network managed by a provider of communication services. Provider network 110 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. In some implementations, provider network 110 may include an Internet Protocol Multimedia Sub-system (IMS) network (not shown in FIG. 1). An IMS network may include a network for delivering IP multimedia services as specified by 3GPP and may provide media flows between user devices and external IP networks or external circuit-switched networks (not shown in FIG. 1). Provider network 110 may connect to, and may enable communication with wireless access network 120, customer network 130, and cloud center network 140. Provider network 110 may include one or more network devices 112.

Network device 112 may include a device configured to perform network functions in provider network 110. For example, network device 112 may include a switch, a router, a firewall, a gateway, a NAT device, a Reconfigurable Optical Add-Drop Multiplexer (ROADM), and/or another type of network device. Some or all of the functionality of network device 112 may be virtualized as a VNF MO in provider network 110.

Wireless access network 120 may enable user equipment (UE) device 124 to connect to provider network 130 for mobile telephone service, Short Message Service (SMS) message service, Multimedia Message Service (MMS) message service, Internet access, access to a private network, cloud computing, and/or other types of data services.

Wireless access network 120 may establish a packet data network connection between UE device 124 and provider network 110. In some implementations, wireless access network 120 may include an LTE wireless access network (e.g., an evolved packet core (EPC) network) based on the LTE standard specified by the $3^{rd}$ Generation Partnership Project (3GPP). In other implementations, wireless access network 120 may include a Code Division Multiple Access (CDMA) wireless access network based on, for example, a CDMA2000 standard. For example, the CDMA wireless access network may include a CDMA enhanced High Rate Packet Data (eHRPD) network (which may provide access to an LTE wireless access network).

In other implementations, wireless access network 120 may include an LTE Advanced (LTE-A) wireless access network and/or any other advanced network, such as a 5G wireless access network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Wireless access network 120 may include one or more access network devices 122 that enable access to provider network 110 for wireless devices, such as UE device 124. Access network device 122 may include, for example, an LTE access network device such as an eNodeB node, an MME node, an SGW node, a PGW node, an HSS node, a Policy Charging and Rules Function (PCRF) node, an Authentication, Authorization, and Accounting (AAA) node, a Multimedia Broadcast Multicast Service (MBMS) node, a Machine Type Communication (MTC) Interworking Function (IWF) node, a Service Capability Server (SCS) node, an evolved Packet Data Gateway (ePDG) node, and/or another type of network node that may be included in a wireless access network. As an example, access network device 122 may include an eNodeB base station device may use the Evolved Universal Terrestrial Radio Access (E-UTRA) air interface to wirelessly communicate with devices. An eNodeB base station device may include one or more devices (e.g., wireless transceivers) and other components and functionality that allow UE device 124 to wirelessly connect to wireless access network 120. The eNodeB base station device may include or be associated with one or more cells. For example, each cell may include a radio frequency (RF) transceiver facing a particular direction. The eNodeB base station device may correspond to a macrocell or to a small cell (e.g., a femtocell, a picocell, a microcell, etc.). Some or all of the functionality of access network device 122 may be virtualized as a VNF MO in provider network 110.

UE device 124 may include a handheld wireless communication device (e.g., a mobile phone, a smart phone, a tablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; and/or any other type of computer device with wireless communication capabilities and a user interface. UE device 124 may be used for voice communication, mobile broadband services (e.g., video streaming, real-time gaming, high speed Internet access etc.), best effort data traffic, and/or other types of applications.

In other implementations, UE device 124 may include an Internet of Things (IoT) computer device enabled with wireless communication functionality and employing machine-to-machine (M2M) communication. In some implementations, the M2M communication may include Machine-Type Communication (MTC), a type of M2M communication standard developed by the $3^{rd}$ Generation Partnership Project (3GPP). In other implementations, the M2M communication may include a different type of communication not tied to a particular 3GPP standard. For example, UE device 124 may include an embedded wireless MTC device that communicates wirelessly with other devices over a machine-to-machine (M2M) interface, such as a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device. An MTC device may correspond to a stationary low data rate MTC device (e.g., parking meter), a stationary high data rate MTC device (e.g., a camera providing a video feed), an MTC device moving at pedestrian speeds (e.g., a health monitoring device attached to a user), and MTC device moving at vehicular speed (e.g., a vehicle telematics device), and/or another type of MTC device.

In other implementations, UE device 124 may correspond to an unmanned aerial vehicle or an unmanned aircraft system that communicates wirelessly with other devices over an M2M interface using MTC and/or another type of M2M communication. Examples of such airborne MTC devices include consumer drone devices used for entertainment, photo or video capture, payload delivery, and/or other uses; commercial delivery drones used to deliver packages to customers; law enforcement drones used for intelligence gathering operations; and/or other types of drones or aerial devices.

Customer network 130 may include a Layer 2 and/or Layer 3 LAN associated with a customer of provider network 110. For example, customer network 130 may reside in one or more locations such as, for example, a residential home, an apartment building, a school, a commercial office building, a shopping mall, a connected mass transit vehicle (e.g., bus, train, plane, boat, etc.), and/or another type of location associated with the customer. Customer network 130 may include WAN interface device 132 and one or more managed customer devices 134. Customer network 130 may receive one or more services via a connection between WAN interface device 132 and provider network 110, such as, for example, a television service, Internet service, and/or voice communication (e.g., telephone) service.

WAN interface device 132 may interface customer network 130 to provider network 110 via a wireless connection and/or via a wired connection. As an example, WAN interface device 132 may include an optical network terminal (ONT). An ONT may connect to provider network 110 via an optical fiber and may function as a gateway device to Gigabit Passive Optical Network (GPON) or a GPON2 located in provider network 110. As another example, WAN interface device 132 may connect to provider network 110 via a wired electrical connection, such as a coaxial cable. As yet another example, WAN interface device 132 may include a wireless transceiver configured to communicate with provider network 110 via a wireless access network (not shown in FIG. 1) using cellular wireless signals.

Managed customer device 134 may include a network device in customer network 130 that is managed by provider network 110. For example, managed customer device 134 may include a network device configured to function as a switch and/or router for devices in customer network 130, may include a layer 2 and/or layer 3 network device, such as a switch, router, firewall, NAT device, gateway, and/or WiFi Access Point, and may support different types of interfaces, such as an Ethernet interface, a WiFi interface, a Multimedia over Coaxial Alliance (MoCa) interface, and/or other types of interfaces. Some or all of the functionality of WAN interface device 132 and/or managed customer device 134 may be virtualized as a VNF MO in provider network 110.

Cloud center network 140 may include a Layer 2 and/or Layer 3 network managed by provider network 110. Cloud center network 140 may include a cloud center access system 142 and a cloud center device 144. Cloud center access system 142 may include one or more devices that connect cloud center network 140 to provider network 110 via a Layer 2 connection or with a Layer 3 connection. For example, cloud center access system 142 may include one or more network devices that function as Layer 2 and/or Layer 3 devices and that maintain Layer 2 and/or Layer 3 separation for different customers and/or different services.

Cloud center device 144 may provide cloud computing services for provider network 110. The cloud services may include, for example, computing as a service, cloud storage, a hosted voice-over-Internet Protocol (VoIP) service, a Network Address Translation (NAT) service, a Virtual Private Network (VPN) service, a Distributed Denial Of Service (DDOS) detection and/or mitigation service, a firewall service, an Intrusion Detection and Prevention System (IDPS), an email filtering service, a filtering service for a particular web site, a load balancing service, a video distribution service, a lawful intercept service on behalf of a law enforcement entity, and/or any other type of service that may be provided by a cloud center. Some or all of the functionality of cloud center access system 142 and/or cloud center device 144 may be virtualized as a VNF MO in provider network 110.

One or more cloud center devices 144 may host VNF MOs, and some or all of the associated VFN architecture associated with the VNF MOs, for provider network 110, wireless access network 120, customer network 130, and/or cloud center network 140. The VNF MOs may be simulated using a generator neural network trained using a GAN.

Modeling system 150 may include one or more devices, such as computer devices and/or server devices, which may manage modeling of VNF MOs hosted in cloud center network 140. For example, modeling system 150 may be used to provide a training set to train GANs for VNF MOs, set hyperparameters for particular neural networks in a GAN, perform validation of training for a GAN, and/or otherwise manage the training and/or operation of a GAN associated with a VNF MO.

SON system 160 may include one or more devices, such as computer devices and/or server devices, which perform self-organization and/or self-optimization functions for provider network 110. For example, SON system 160 may perform a SON action to adjust one or more configuration parameters of provider network 110, wireless access network 120, customer network 130, and/or cloud center network 140. The SON action may, for example, adjust at least one of a coverage optimization parameter, a capacity optimization parameter, a handover parameter, a neighbor list changes parameter, an antenna tilt parameter, a delay optimization parameter, a carrier optimization parameter, a random access channel parameter, and/or another type of optimization parameter. SON system 160 may use one or more generator neural networks to estimate an expected network performance resulting from a proposed SON action and may select to carry out the proposed SON action if the expected network performance satisfies a performance threshold. Furthermore, SON system 160 may use one or more generator neural networks to perform reinforcement learning to update a policy that relates network states to potential SON actions to be performed and the estimated network performance associated with particular ones of the potential SON actions.

Testing system 170 may include one or more devices, such as computer devices and/or server devices, which test provider network 110. For example, testing system 170 may maintain a simulated environment for provider network 110, wireless access network 120, customer network 130, and/or cloud center network 140 and may test particular network configurations based on a generated queue to test cases. The test cases may be manually generated by an operator. Additionally, a generator neural network may be trained to automatically generate test cases for testing system 170.

Although environment 100 includes a single network device 112, a single wireless access network 120, a single access network device 122, a single UE device 124, a single customer network 130, a single WAN interface device 132, a single managed customer device 134, a single cloud center network 140, a single cloud center access system 142, a single cloud center device 144, a single modeling system 150, a single SON system 160, and a single testing system 170 for illustrative purposes, in practice, environment 100 may include multiple network devices 112, multiple wireless access networks 120, multiple access network devices 122, multiple UE devices 124, multiple customer networks 130, multiple WAN interface devices 132, multiple managed customer devices 134, multiple cloud center networks 140, multiple cloud center access systems 142, multiple cloud center devices 144, multiple modeling systems 150, multiple SON systems 160, and multiple testing systems 170.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
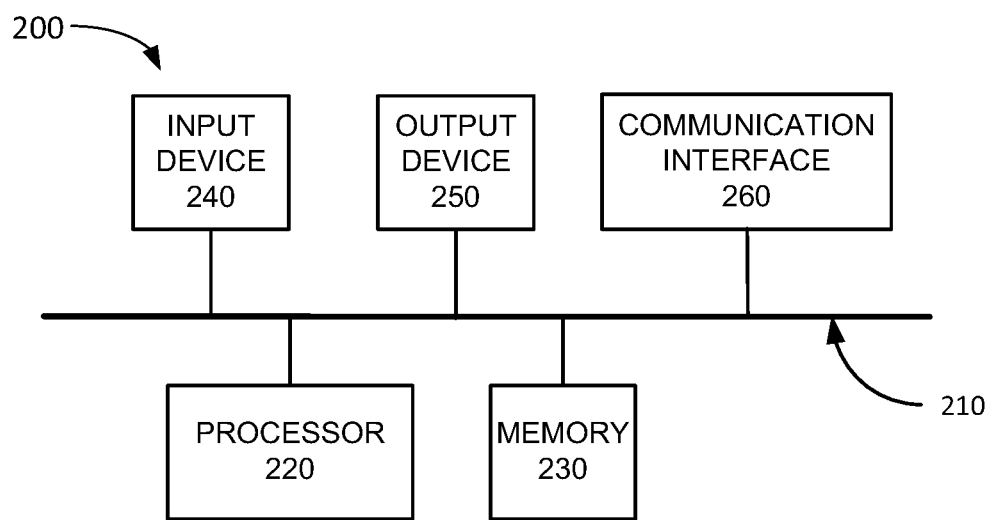
FIG. 2 is a diagram illustrating exemplary components of a device that may be included in a device or system of FIG. 1.

FIG. 2 is a diagram illustrating exemplary components of device 200 according to an implementation described herein. Network device 112, access network device 122, UE device 124, WAN interface device 132, managed customer device 134, cloud center access system 142, cloud center device 144, modeling system 150, SON system 160, and/or testing system 170 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. For example, processor 220 may include one or more Central Processing Units (CPUs) and/or one or more Graphics Processing Units (GPU). In other embodiments, processor 220 may include an application-specific integrated circuit (ASIC), a field-programmable gate array (FPGA), and/or another type of integrated circuit or processing logic. Processor 220 may control operation of device 200 and its components.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200 and/or to collect information from the environment using one or more sensors. Input device 240 may include, for example, buttons (e.g., a keyboard, keys of a keypad, control buttons, etc.), a mouse, a pen, a joystick, a tracking pad, a stylus, a remote control, a microphone or another audio capture device, an image and/or video capture device (e.g., a camera), a touch-screen display, a light sensor, a gyroscope, an accelerometer, a proximity sensor, a temperature sensor, a barometer, a compass, a health sensor (e.g., pulse rate monitor, etc.), and/or another type of input device. In some implementations, device 200 may be managed remotely and may not include input device 240. In other words, device 200 may be "headless" and may not include a keyboard, for example.

Output device 250 may output information to an operator of device 200 and/or to control device 200 and/or the environment using one or more actuators. Output device 250 may include a display, a printer, a speaker, an illumination source (e.g., a camera flash), an actuator to cause device 200 to vibrate, a motor to cause part of device 200 to move, a lock device, and/or another type of output device. For example, device 200 may include a display, which may include a liquid-crystal display (LCD), a light emitting diode (LED) display, an organic LED (OLED) display, an electrophoretic (e.g., electronic ink) display, and/or another type of display device for displaying content to a user. In some implementations, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to an antenna for transmitting and receiving RF signals. For example, if device 200 is included in UE device 124, communication interface 260 may include an antenna assembly that includes one or more antennas to transmit and/or receive RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface or an interface for another type of short range (e.g., less than 100 meters) wireless communication method, a radio-frequency identification (RFID) interface, a near-field communications (NFC) wireless interface, a Global Positioning System (GPS) receiver to obtain location information from GPS satellites, an optical transceiver, and/or any other type of interface that converts data from one form to another form.

As will be described in detail below, device 200 may perform certain operations relating to virtual network emulation and SON control using generator neural networks. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
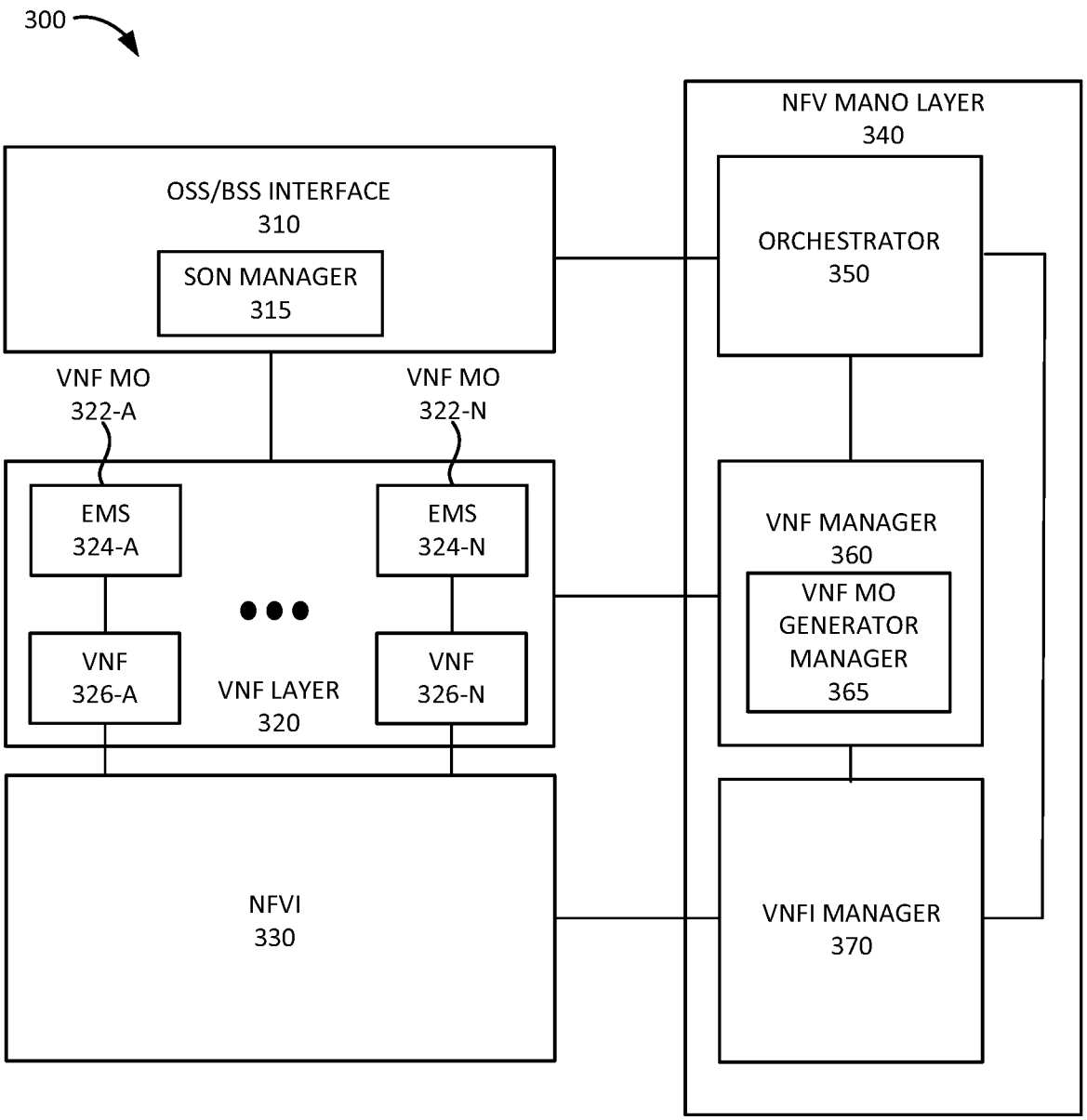
FIG. 3 is a diagram illustrating exemplary functional components of a virtualized network function architecture that may be used by the provider network of FIG. 1.

FIG. 3 is a diagram illustrating exemplary functional components of an NFV architecture system 300. The functional components of NFV architecture system 300 may be implemented, for example, via processor 220 executing instructions from memory 230. Alternatively, some or all of the functional components included in NFV architecture system 300 may be implemented via hard-wired circuitry. In some implementations, NFV architecture system 300 may be implemented by one or more cloud center devices 144. In other implementations, NFV architecture system 300 may be implemented by one or more other devices, such as, for example, one or more of modeling system 150, SON system 160, and/or testing system 170.

As shown in FIG. 3, NFV architecture system 300 may include an operations support system/business support system (OSS/BSS) interface 310, a VNF layer 320, an NFV Infrastructure (NFVI) 330, and an NFV MANO layer 340.

OSS/BSS interface 310 may interface with OSS systems, such as a network monitoring system, a network provisioning system, a network management system, as well as modeling system 150, SON system 160, and/or testing system 170. Furthermore, OSS/BSS interface 310 may interface with BSS systems, such as an ordering system, a customer service system, and/or a billing system. OSS/BSS interface 310 may enable the OSS and BSS systems to manage the virtualized components of provider network 110, wireless access network 120, customer network 130, and/or cloud center network 140.

OSS/BSS interface 310 may include a SON manager 315. SON manager 315 may be configured to communicate with SON system 160 and may include one or more generator neural networks trained to determine the network performance based on a proposed SON action and/or trained to generate potential future network states. Moreover, SON manager 315 may include a generator neural network trained to generate test cases for testing system 170.

VNF layer 320 may include VNF MOs 322-A to 322-N. Each VNF MO 322 may correspond to an instance of a VNF MO of a particular type. For example, VNF MO 322 may include an Element Management System (EMS 324) and a VNF 326. EMS 324 may manage VNF MO 322 and VNF 326 may include the implementation of network functions performed by the VNF MO 322. For example, if NFV architecture system 300 is used for wireless access network 120, a first VNF MO 322 may correspond to a virtualized eNodeB, a second VNF MO may correspond to a virtualized MME, a third VNF MO may correspond to a virtualized SGW, a fourth VNF MO may correspond to a virtualized PGW, a fifth VNF MO may correspond to an HSS, etc.

NVFI 330 may include hardware (e.g., processors, memory, storage components, networking components, etc.) and software components on which VNF MOs 322 are deployed. For example, NVFI 330 may include the hardware and software components included in one or more cloud center devices 144. NFV MANO layer 340 may corresponds to a European Telecommunications Standards Institute (ETSI) NFV management and organization (MANO) architecture. NFV MANO layer 340 may include an orchestrator 350, a VNF manager 360, and a VNFI manager 370. Orchestrator 350 may perform orchestration of NFV to ensure that sufficient resources are available to provide a network service and that a particular network function is deployed, changed, or removed. Thus, orchestrator 350 may coordinate requests received via OSS/BSS interface 310 with VNF manager 360 and VNFI manager 370.

VNF manager 360 may manage VNF MOs 322. VNF manager 360 may perform lifecycle management of particular VNF MOs 322, including instantiation, scaling, updating, and/or termination of particular VNF MOs 322 based on instructions received from orchestrator 350. VNF manager 360 may include a VNF MO generator manager 365. VNF MO generator manager 365 may manage VNF MO generators. For example, VNF MO generator manager 365 may generate, train, and/or update VNF MO generators for particular types of VNF MOs. Each generator VNF MO may be trained using a GAN managed by VNF MO generator manager 365. VNFI manager 370 may manage NFVI 330. For example, VNFI manager 370 may maintain a mapping of VNF MOs 322 to physical resources and may orchestrate the allocation, updating, and/or release of NFVI resources.

Although FIG. 3 shows exemplary components of NFV architecture system 300, in other implementations, NFV architecture system 300 may include fewer components, different components, additional components, or differently arranged components than depicted in FIG. 3. Additionally or alternatively, one or more components of NFV architecture system 300 may perform one or more tasks described as being performed by one or more other components of NFV architecture system 300.

Figure 4:
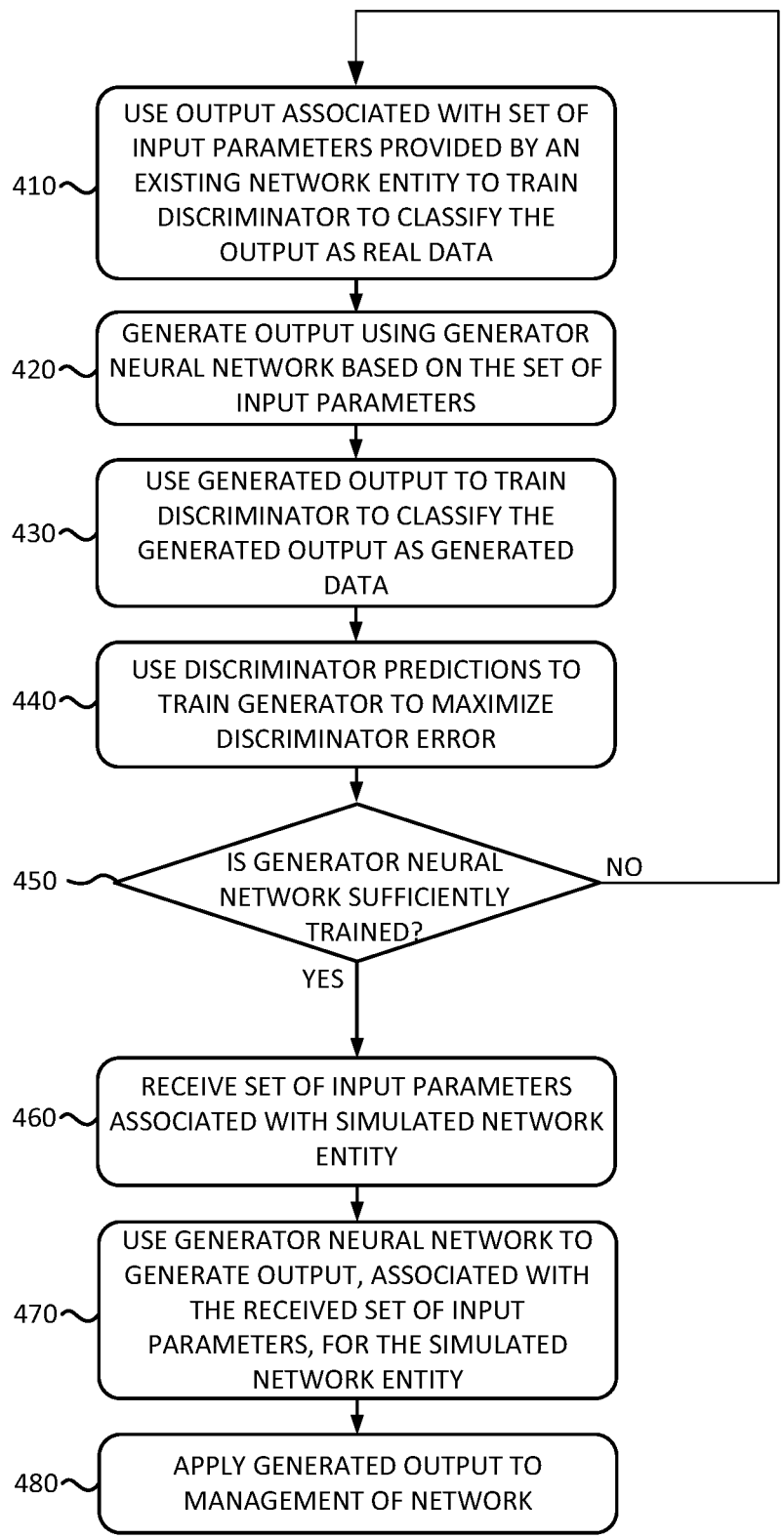
FIG. 4 is a flowchart of a process for using a generator neural network to simulate a network entity according to an implementation described herein.

FIG. 4 is a flowchart of a process for using a generator neural network to simulate a network entity according to an implementation described herein. In some implementations, the process of FIG. 4 may be performed by one or more cloud center devices 144. In other implementations, some or all of the process of FIG. 4 may be performed by another device or a group of devices separate from the one or more cloud center devices 144, such as modeling system 150 and/or SON system 160. For example, in some implementations, VNF MO generator manager 365 or SON manager 315 may train a generator neural network and deploy a trained generator neural network. In other implementations, modeling system 150 and/or SON system 160 may train a generator neural network and provide a trained generator neural network to VNF MO generator manager 365 or SON manager 315 for deployment.

The process of FIG. 4 may include using output associated with a set of input parameters provided by an existing network entity to train a discriminator to classify the output as real data (block 410), generating output using a generator neural network based on the set of input parameters (block 420), and using the generated output to train the discriminator to classify the generated output as generated data (block 430). For example, VNF MO generator manager 365, or SON manager 315, may initialize a new GAN with a generator neural network and a discriminator neural network. Furthermore, VNF MO generator manager 365, or SON manager 315, may select a training set of input to train the GAN. The input may be selected based on the type of generator neural network to be trained. As an example, a VNF MO generator neural network may be trained using an input set that includes the capabilities, configuration, and workload of a network node to be simulated by the VNF MO generator neural network. As another example, a network performance generator neural network may be trained using an input set that includes a network state and a SON action. As yet another example, a network model generator neural network may be trained using a time series of network states/configurations. As yet another example, a test cases generator neural network may be trained using an input set of test cases in a testing queue for testing system 170.

For each input vector in a first training set, a VNF MO may provide an output and the output may be used to train the discriminator neural network to identify the output as real data. The generator neural network may then generate a set of generated output data based on the input parameters. In some implementations, no input parameters may be used and the generator neural network may be initialized using random noise as input data. For each vector in the generated output data set, the discriminator neural network may be trained to identify the generated data as generated data. Thus, the discriminator neural network may be trained as a classifier that classifies an input vector into a real data class or a generated data class. That is, the discriminator neural network may be trained to minimize the error of classifying an input vector as real data or generated data.

The discriminator predictions may be used to train the generator neural network to maximize the discriminator error (block 440). Thus, the discriminator neural network may be trained to generate data that causes the discriminator neural network to incorrectly classify the generated data as real data. A determination may be made as to whether the generator neural network is sufficiently trained (block 450). For example, VNF MO generator manager 365, or SON manager 315, may determine whether the discriminator neural network satisfies a performance criterion for classifying the generated data as real data. If it is determined that the generator neural network is not sufficiently trained (block 450—NO), processing may return to block 410 to perform another round of training. If it is determined that the generator neural network is sufficiently trained (block 450—YES), processing may proceed to block 460.

The process of FIG. 4 may further include receiving a set of input parameters associated with a simulated network entity (block 460), using the generated neural network to generate output, associated with the received set of input parameters, for the simulated network entity (block 470), and applying the generated output to the management of a network (block 480). As an example, VNF MO generator manager 365 may receive a request from orchestrator 350 to generate a VNF MO of a particular type (e.g., an eNodeB). VNF MO generator manager 365 may, in response, generate a new VNF MO 322 as an instance of a generator neural network trained to function as an eNodeB. The generated VNF MO 322 may receive a set of input parameters, such as the capabilities, configuration, and estimated workload of the VNF MO and may generate a set of outputs for the set of inputs. The set of outputs may include data plane outputs and management plane outputs. As an example, if the VNF MO corresponds to a virtualized eNodeB, the data plane outputs may include a set of RABs managed by the eNodeB. For example, each RAB may include a Quality of Service Class Identifier (QCI), a maximum frame size, bandwidth, and/or other RAB parameters. Furthermore, VNF MO may include a set of management plane outputs, such as a set of KPIs.

As another example, SON manager 315 may receive a request from SON system 160 to estimate network performance based on a particular network state and a proposed SON action and may use a network performance generator neural network to estimate a resulting network performance based on the proposed SON action. If the performance is above a performance requirement, the proposed SON action may be applied to the network (e.g., provider network 110, wireless access network 120, customer network 130, cloud center network 140, etc.). For example, SON system 160 may execute a proposed SON action to adjust antenna tilts of transceivers associated with neighboring eNodeBs to improve coverage, adjust neighbor lists of one or more eNodeBs to improve handover efficiency, perform load balancing between two routers to improve use of network bandwidth, etc.

In some implementations, a set of inputs may not be received and a generator neural network may not require a set of inputs to generate data. For example, a test case generator neural network may generate test cases without requiring input data. The generated test cases may be used by testing system 170 to test the network (e.g., provider network 110, wireless access network 120, customer network 130, cloud center network 140, etc.).

Figure 5A:
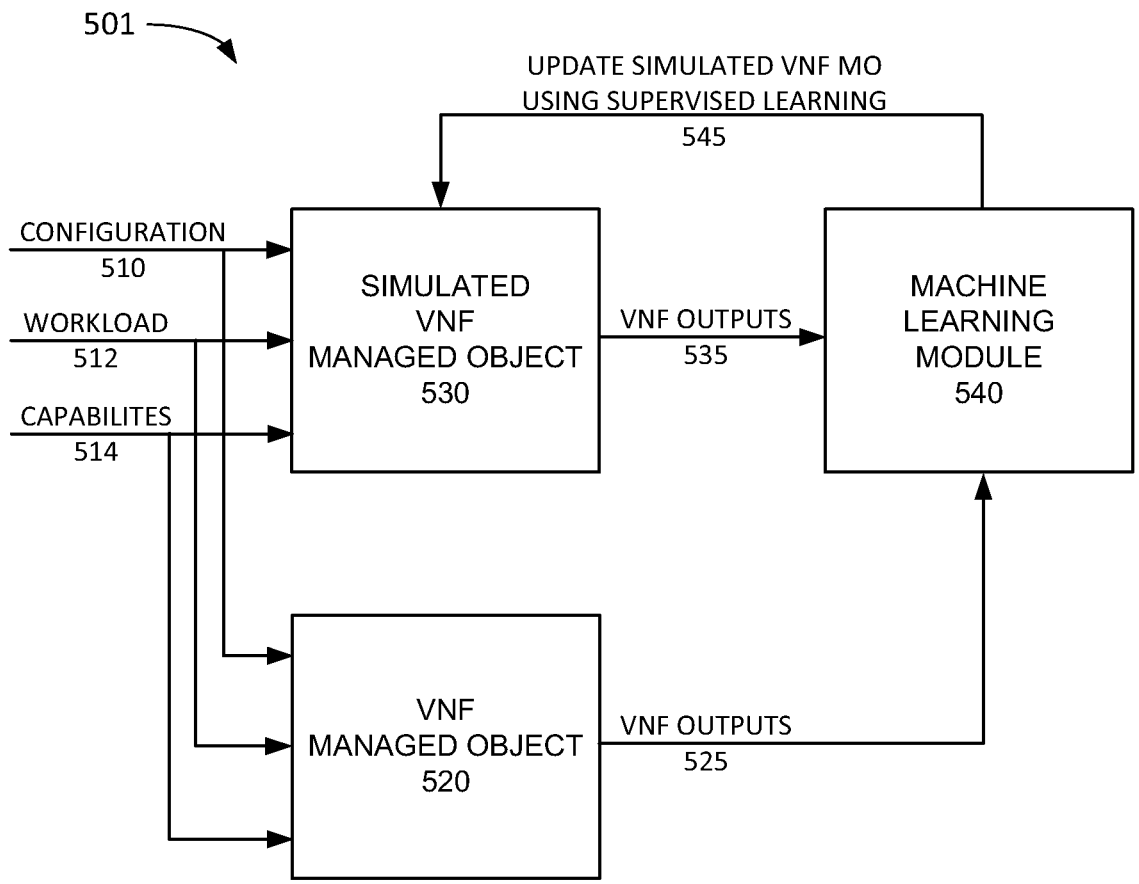
FIG. 5A is a diagram illustrating a simulated virtual network function (VNF) managed object (MO) according to an implementation described herein.

FIG. 5A is a diagram illustrating a system 501 for training a simulated VNF MO. As shown in FIG. 5A, system 501 may include a VNF MO 520, a simulated VNF MO 530, and a machine learning module 540. FIG. 5A illustrates a principle of a simulated VNF MO 530 that is trained to simulate an existing VNF MO 520 using a set of inputs that includes a configuration vector 510, a workload vector 512, and a capabilities vector 514. For example, if VNF MO 520 and simulated VNF MO 530 represent a virtualized eNodeB, the capabilities vector 514 may specify the number of cells, the available bands, the number and arrangement of antennas, memory capacity, transmission power capacity, the type of transmission technology, etc.; the configuration vector 510 may specify a selected LTE band, a bandwidth, a downlink center frequency, an MCC, an MNC, a transmitter antenna power gain, a receiver antenna power gain, etc.; and the workload vector 512 may specify a total number of UE devices connected to the eNodeB, a number of voice connections associated with the UE devices, a number of video connections associated with the UE devices, a number of handovers within a particular time period associated with the UE devices, a movement speed associated with the UE devices, an elevation associated with the UE devices, data throughputs associated with the UE devices, a packet size variability associated with the UE devices, a variance in packet arrival times associated with the UE devices, a call drop rate associated with the UE devices, latency associated with the UE devices, error rates associated with the UE devices, a signal strength associated with the UE devices, etc.

VNF MO 520 may provide a set of VNF outputs 525 based on the input vectors and simulated VNF MO 530 may generate a set of VNF outputs 535. For example, if VNF MO 520 and simulated VNF MO 530 represent a virtualized eNodeB, the set of outputs may include a set of RABs for the eNodeB and a set of KPIs. A machine learning module 540 may compare VNF outputs 525 with VNF outputs 535 and may update simulated VNF MO 530 using supervised learning (signal 545). In FIG. 5A, machine learning module 540 may include any type of classifier, such as, for example, a regression classifier, a naïve Bayesian classifier, a neural network classifier, a K-nearest neighbor classifier, a support vector machine classifier, etc. Thus, any type of machine learning technique may be used to train simulated VNF MO 530 to function as VNF MO 520. In particular, a generator neural network may be used for simulated VNF MO 530 and a discriminator neural network may be used for machine learning module 540, as described below with reference to FIG. 5B.

Figure 5B:
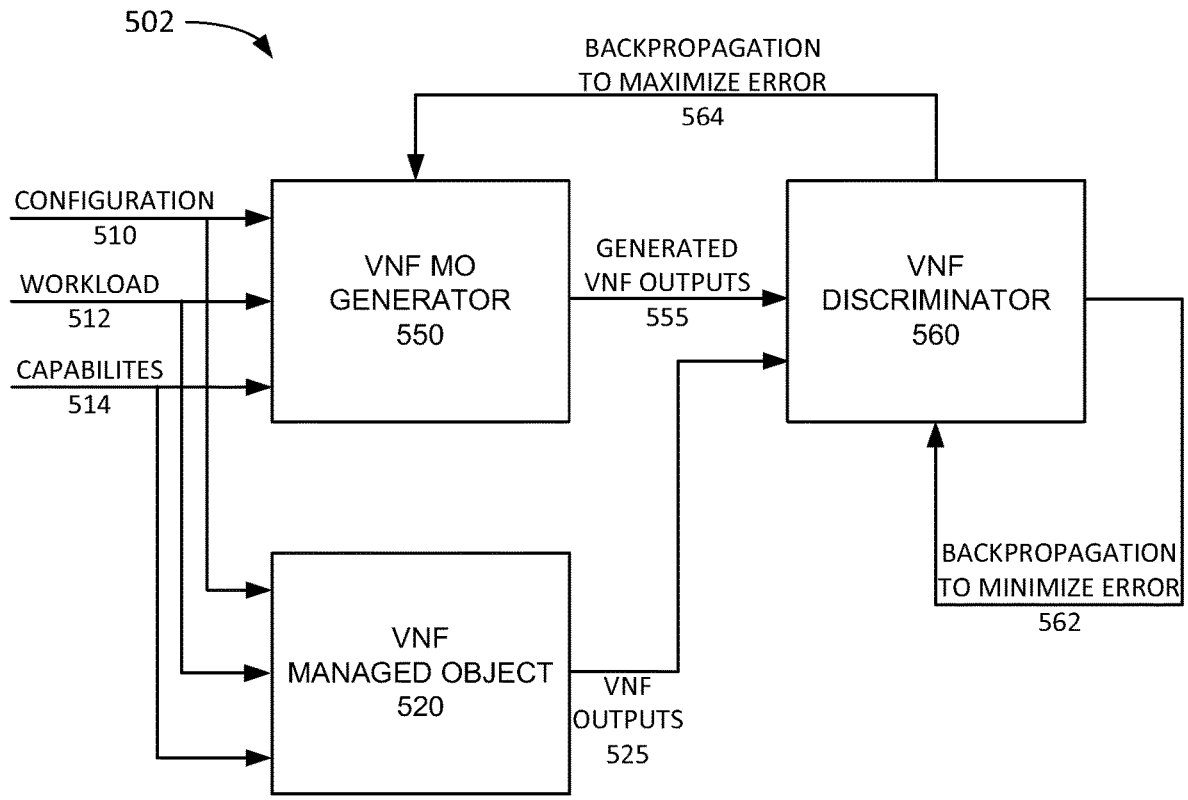
FIG. 5B is a diagram illustrating a generator neural network for a simulated VNF MO according to an implementation described herein.

FIG. 5B is a diagram illustrating a GAN 502 for training a simulated VNF MO. As shown in FIG. 5B, GAN 502 may include VNF MO 520, a VNF MO generator 550 (corresponding to simulated VNF MO 530), and VNF discriminator 560 (corresponding to machine learning module 540). VNF MO 520 and VNF MO generator 550 may both take as input a configuration vector 510, a workload vector 512, and a capabilities vector 514. VNF MO 520 may generate VNF outputs 525 and VNF MO generator 550 may generate generated VNF outputs 555. VNF discriminator 560 may alternate between being trained to classify VNF outputs 525 as real data and to classify generated VNF outputs 555 as generated data. VNF discriminator 560 may be trained using backpropagation to minimize the error made with respect to the correct classification of VNF outputs 525 and generated VNF outputs 555 (signal 562).

After a training epoch using VNF outputs 525 and a training epoch using generated VNF outputs 555, VNF MO generator 550 may be trained using back propagation to maximize the error made by VNF discriminator 560 with respect to the correct classification of VNF outputs 525 and generated VNF outputs 555 (signal 564). After VNF MO generator 550 performs satisfactorily, by, for example, causing VNF discriminator 560 to incorrectly classify generated VNF outputs 555 as real data at a particular performance requirement rate, VNF MO generator 550 may be designated as trained.

Figure 5C:
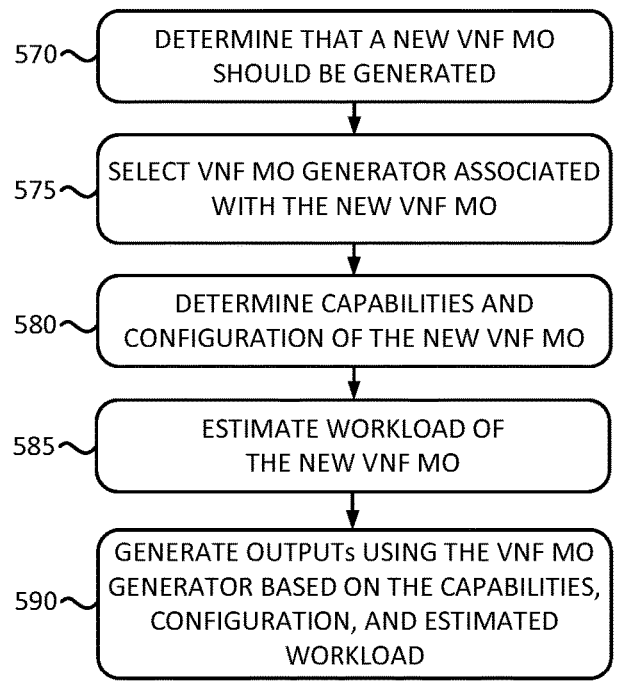
FIG. 5C is a flowchart of a process of generating a simulated VNF MO according to an implementation described herein.

FIG. 5C is a flowchart of a process of generating a simulated VNF MO by using GAN 502. In some implementations, the process of FIG. 5C may be performed by one or more cloud center devices 144. In other implementations, some or all of the process of FIG. 5C may be performed by another device or a group of devices separate from the one or more cloud center devices 144, such as modeling system 150.

The process of FIG. 5C may include determining that a new VNF MO should be generated (block 570) and selecting a VNF MO generator associated with the new VNF MO (block 575). For example, VNF MO generator manager 365 may receive a request from orchestrator 350 to generate a VNF MO of a particular type (e.g., an eNodeB). VNF MO generator manager 365 may, in response, generate a new VNF MO 322 as an instance of a generator neural network trained to function as an eNodeB.

The process of FIG. 5C may further include determining capabilities and configuration of the new VNF MO (block 580), estimating a workload of the new VNF MO (block 585), and generating outputs using the VNF MO generator based on the capabilities, configuration, and estimated workload (block 590). The generated VNF MO 322 may receive, from orchestrator 350, a specified set of input parameters that include capabilities, configuration, and estimated workload of the VNF MO and may generate a set of outputs for the set of inputs. The set of outputs may include data plane outputs and management plane outputs. As an example, if the VNF MO corresponds to a virtualized eNodeB, the data plane outputs may include a set of RABs managed by the eNodeB. For example, each RAB may include a Quality of Service Class Identifier (QCI), a maximum frame size, bandwidth, and/or other RAB parameters. Furthermore, VNF MO may include a set of management plane outputs, such as a set of KPIs.

Figure 6A:
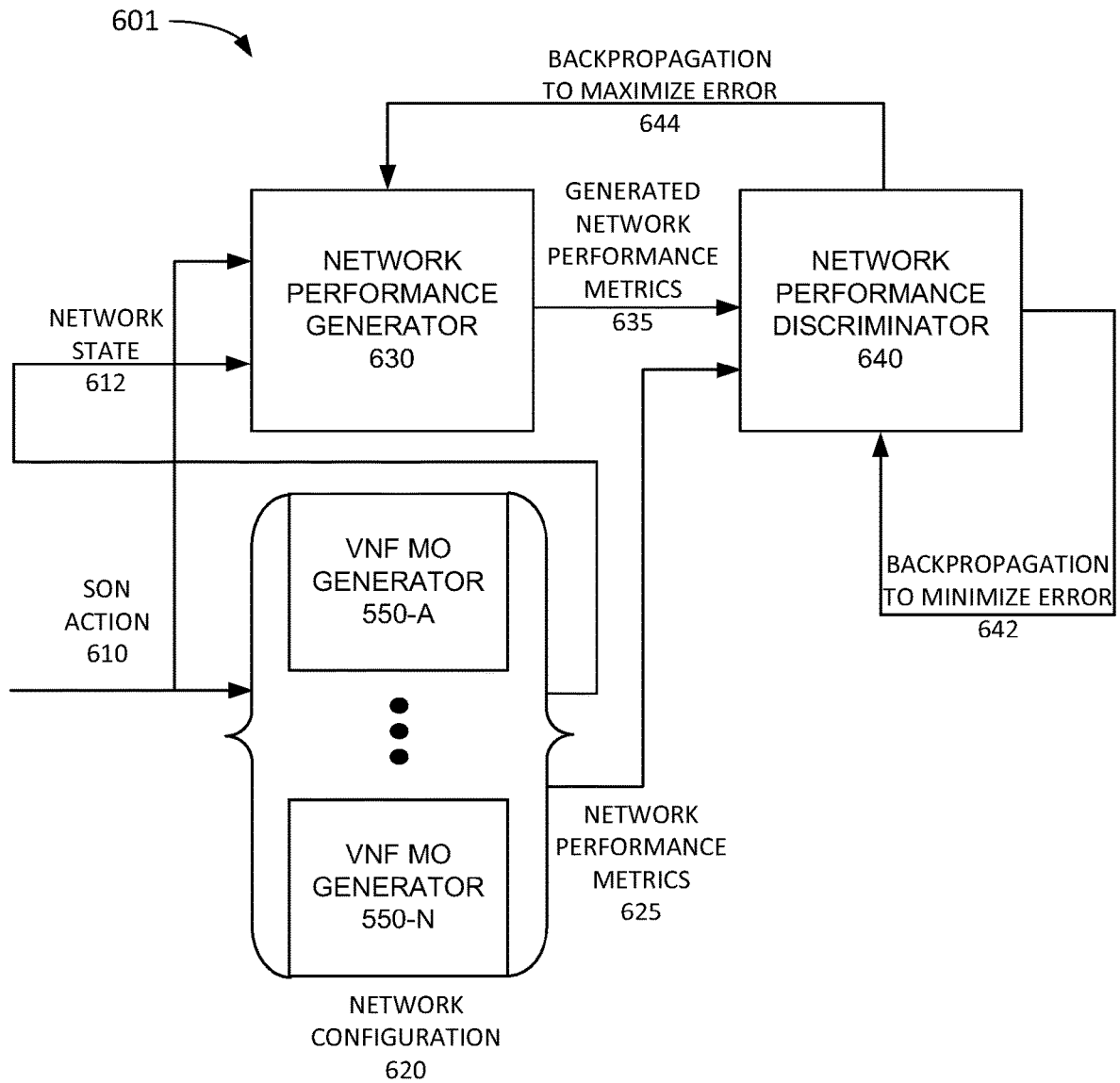
FIG. 6A is a diagram illustrating a generator neural network for determining network performance according to an implementation described herein.

FIG. 6A is a diagram illustrating a network performance GAN 601 for training a network performance generator. As shown in FIG. 6A, GAN 601 may include a set of VNF MO generators 550-A to 550-N, a network performance generator 630, and a network performance discriminator 640. VNF MOs 550 may correspond to network nodes in a particular network (e.g., one or more of provider network 110, wireless access network 120, customer network 130, and/or cloud center network 140, etc.) and may represent a network configuration/state.

VNF MO generators 550 may receive as input a SON action 610. For example, SON system 150 may change a configuration of one or more VNF MOs corresponding to the VNF MO generators 550 in order to improve an coverage optimization parameter, a capacity optimization parameter, a handover parameter, a neighbor list changes parameter, an antenna tilt parameter, a delay optimization parameter, a carrier optimization parameter, a random access channel parameter, and/or another type of SON parameter.

In response to SON action 610, VNF MO generators 550 may generate a set of outputs, which may be used to determine one or more network performance metrics 625. The one or more network performance metrics 625 may be determined directly from network performance metrics 625 (e.g., from management plane outputs associated with VNF MO generators 550) and/or may be calculated by SON system 150 and provided to network performance discriminator 640. The network performance metrics may include, for example, accessibility KPIs, availability KPIs, retainability KPIs, mobility KPIs, service integrity KPIs, utilization KPIs, traffic KPIs, and/or other types of performance metrics.

Network performance generator 630 may receive as input SON action 610 and a network state 612 and generate generated network performance metrics 635. Network state 612 may correspond to a vector representing the configurations of VNF MO generators 550. Network performance discriminator 640 may take turns being trained to classify network performance metrics 625 as real data and to classify generated network performance metrics 635 as generated data. Network performance discriminator 640 may be trained using backpropagation to minimize the error made with respect to the correct classification of network performance metrics 625 and generated network performance metrics 635 (signal 642).

After a training epoch using network performance metrics 625 and a training epoch using generated network performance metrics 635, network performance generator 630 may be trained using back propagation to maximize the error made by network performance discriminator 640 with respect to the correct classification of network performance metrics 625 and generated network performance metrics 635 (signal 644). After network performance generator 630 performs satisfactorily, by, for example, causing network performance discriminator 640 to incorrectly classify generated network performance metrics 635 as real data at a particular performance requirement rate, network performance generator 630 may be designated as trained.

Figure 6B:
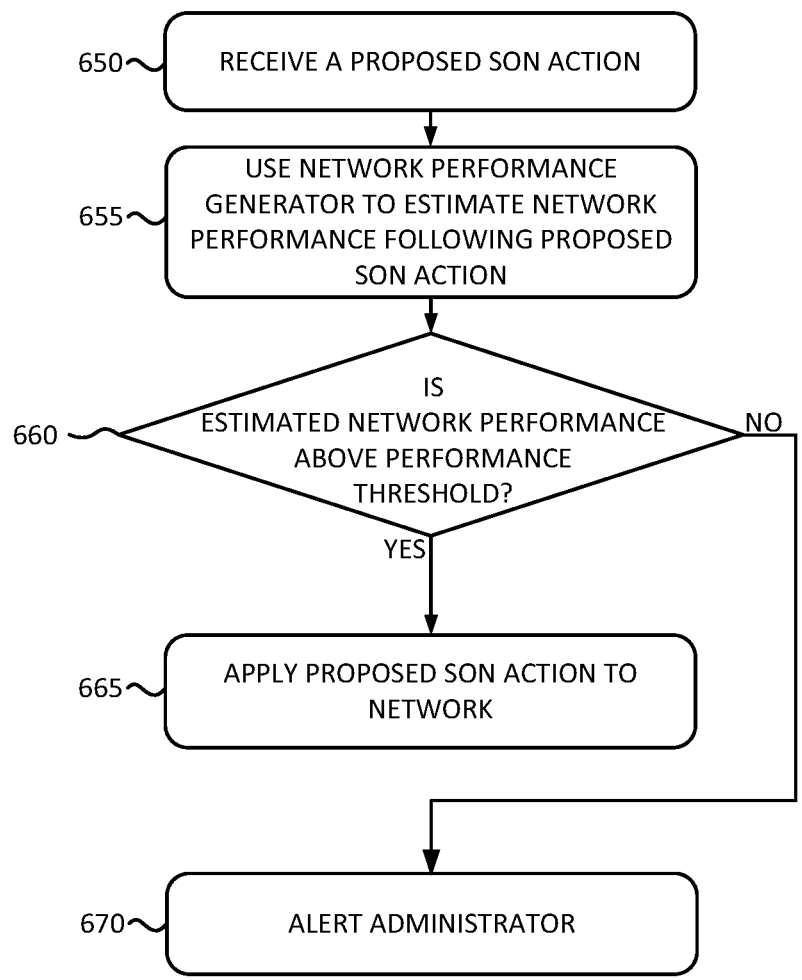
FIG. 6B is a flowchart of a process of evaluating a self-organizing network (SON) action using a generator neural network according to an implementation described herein.

FIG. 6B is a flowchart of a process of evaluating a proposed SON action using network performance GAN 601 according to an implementation described herein. In some implementations, the process of FIG. 6B may be performed by one or more cloud center devices 144. In other implementations, some or all of the process of FIG. 6B may be performed by another device or a group of devices separate from the one or more cloud center devices 144, such as SON system 160.

The process of FIG. 6B may include receiving a proposed SON action (block 650) and using a network performance generator to estimate network performance following the proposed SON action (block 655). For example, SON system 160 may send a proposed SON action to SON manager 315 and SON manager 315 may use network performance generator 630 to output generated network performance metrics 635 based on the proposed SON action and based on a current network configuration.

A determination may be made as to whether the estimated network performance is above a performance threshold (block 660). For example, the generated network performance metrics 635 may be compared to one or more performance thresholds to determine whether applying the proposed SON action to the network would result in satisfactory network performance. If it is determined that the estimated network performance is above the performance threshold (block 660—YES), the proposed SON action may be applied to the network (block 665). For example, SON manager 315 may provide the proposed SON action to orchestrator 350 and orchestrator 350 may instruct VNF manager 360 to apply the proposed SON action to one or more VNF MOs 322. If it is determined that the estimated network performance is not above the performance threshold (block 660—NO), the proposed SON action may not be applied to the network and an administrator may be alerted (block 670). For example, SON manager 315 may instruct SON system 160 that the proposed SON action was rejected and SON system 160 may generate an error message.

Figure 7:
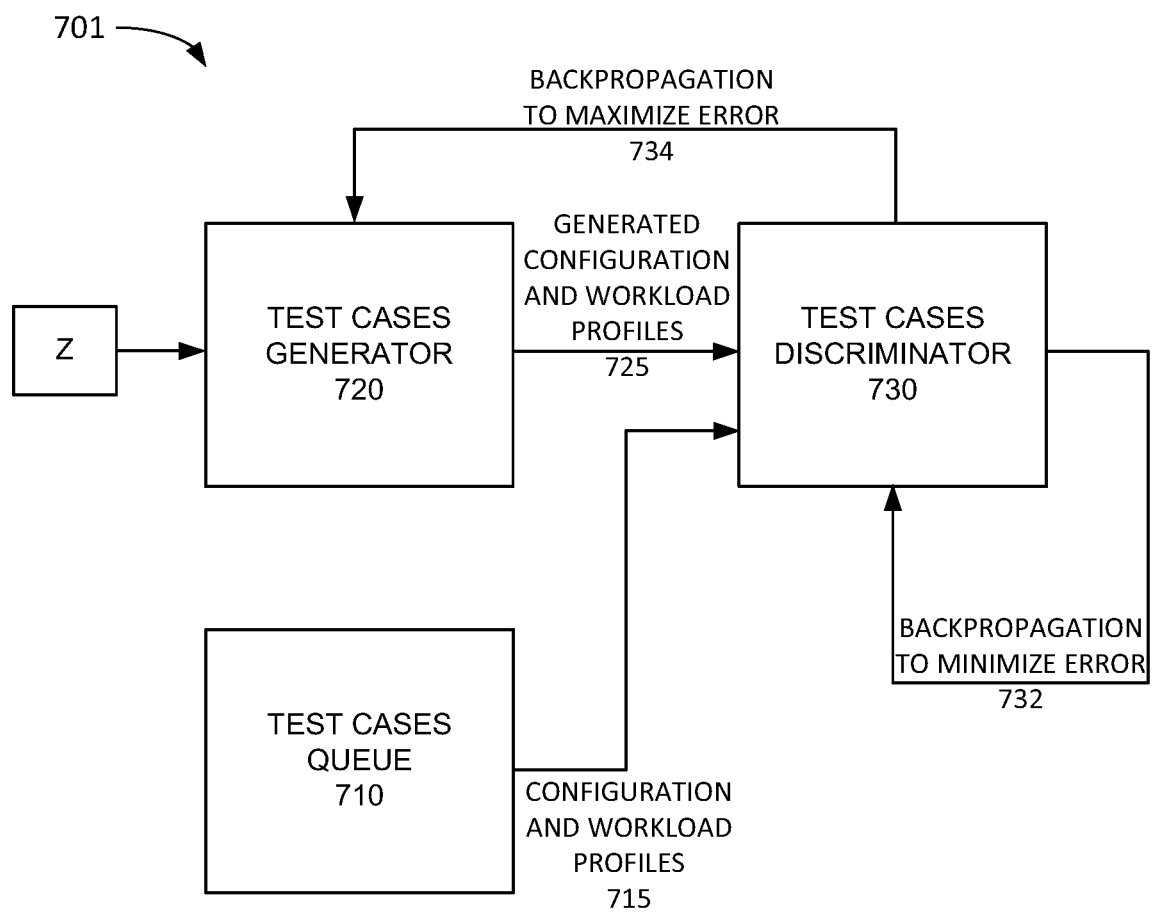
FIG. 7 is a diagram illustrating a generator neural network for generating test cases according to an implementation described herein.

FIG. 7 is a diagram illustrating a test cases GAN 701 for training a test cases generator. As shown in FIG. 7, GAN 701 may include a test cases queue 710, a test cases generator 720, and a test cases discriminator 730. Test cases queue 710 may include a queue of configuration and workload profiles 715 generated by a human operator to be processed by testing system 170. For example, testing system 170 may apply a configuration and workload profile to a simulated model of a network (e.g., provider network 110, wireless access network 120, customer network 130, cloud center network 140, etc.) to test for errors, performance, resource use, etc.

Test cases generator 720 may receive as initial input random noise (represented as Z in FIG. 7) and may output generated configuration and workload profiles 725 (which may initially, before test cases generator 720 starts to be trained, correspond to random noise). Test cases discriminator 730 may alternate between being trained to classify configuration and workload profiles 715 as real data and to classify generated configuration and workload profiles 725 as generated data. Test cases discriminator 730 may be trained using backpropagation to minimize the error made with respect to the correct classification of configuration and workload profiles 715 and generated configuration and workload profiles 725 (signal 732).

After a training epoch using configuration and workload profiles 715 and generated configuration and workload profiles 725, test cases generator 720 may be trained using back propagation to maximize the error made by test cases discriminator 730 with respect to the correct classification of configuration and workload profiles 715 and generated configuration and workload profiles 725 (signal 734). After test cases generator 720 performs satisfactorily, by, for example, causing test cases discriminator 730 to incorrectly classify generated configuration and workload profiles 725 as real data at a particular performance requirement rate, test cases generator 720 may be designated as trained. After test cases generator 720 is designated as trained, test cases generator 720 may provide generated test cases to testing system 170.

Figure 8A:
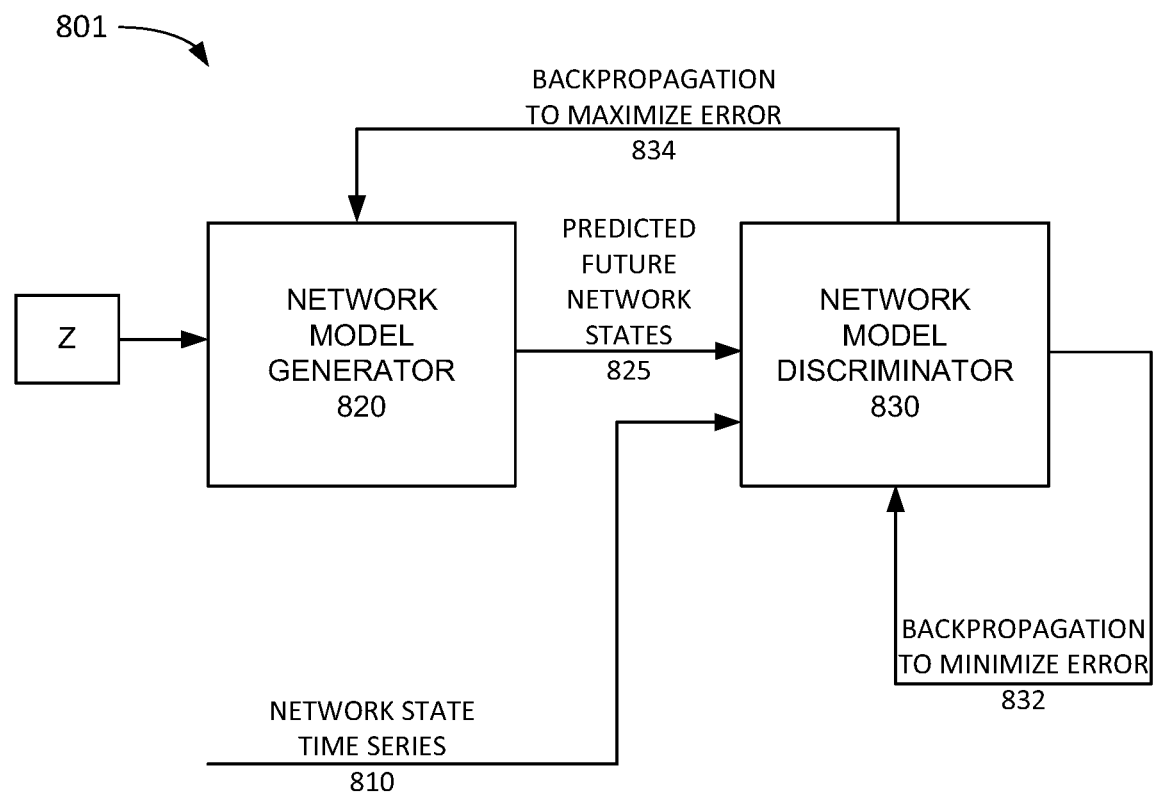
FIG. 8A is a diagram illustrating a generator neural network for predicting future network states according to an implementation described herein.

FIG. 8A is a diagram illustrating a GAN 801 for training a network model generator 820. As shown in FIG. 8A, GAN 801 may include a network state time series 810, a network model generator 820, and a network model discriminator 830. Network state time series 810 may include a series of network configuration profiles experienced by a network (e.g., provider network 110, wireless access network 120, customer network 130, cloud center network 140, etc.) over a period of time.

Network model generator 820 may receive as initial input random noise (represented as Z in FIG. 8A) and may output a predicted future network state 825 (which may initially, before network model generator 820 starts to be trained, correspond to random noise). Network model discriminator 830 may take turns being trained to classify network state time series 810 as real data and to classify predicted future network states 825 as generated data. Network model discriminator 830 may be trained using backpropagation to minimize the error made with respect to the correct classification of network state time series 810 and predicted future network states 825 (signal 832).

After a training epoch using network state time series 810 and predicted future network states 825, network model generator 820 may be trained using back propagation to maximize the error made by network model discriminator 830 with respect to the correct classification of network state time series 810 and predicted future network states 825 (signal 834). After network model generator 820 performs satisfactorily, by, for example, causing network model discriminator 830 to incorrectly classify predicted future network states 825 as real data at a particular performance requirement rate, network model generator 820 may be designated as trained. After network model generator 820 is trained, predicted future network states 825 may be used to perform reinforcement learning for SON system 160, as explained below with reference to FIGS. 8B and 8C.

Figure 8B:
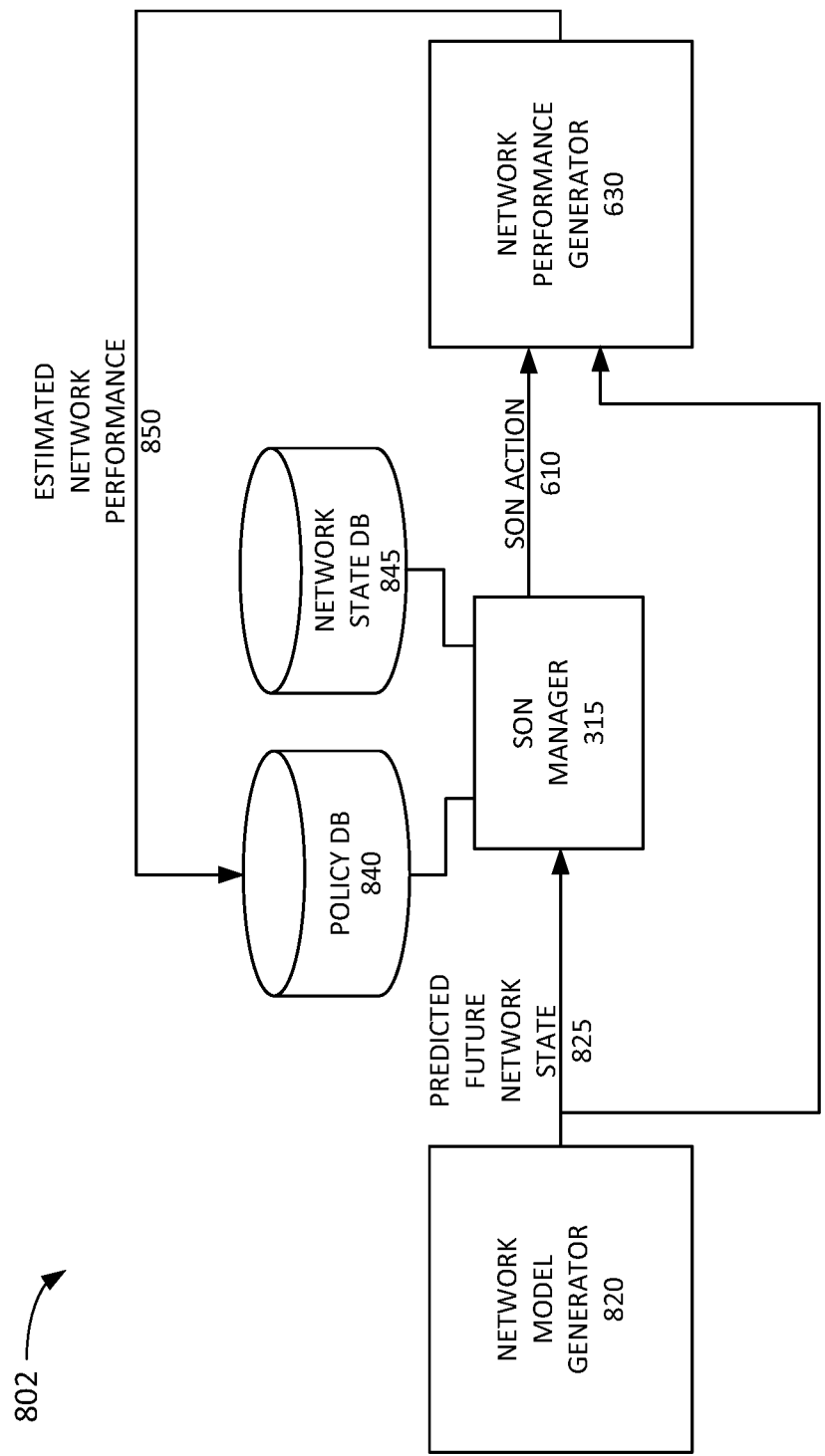
FIG. 8B is a diagram of a system for applying reinforcement learning to a network entity according to an implementation described herein.
Figure 8C:
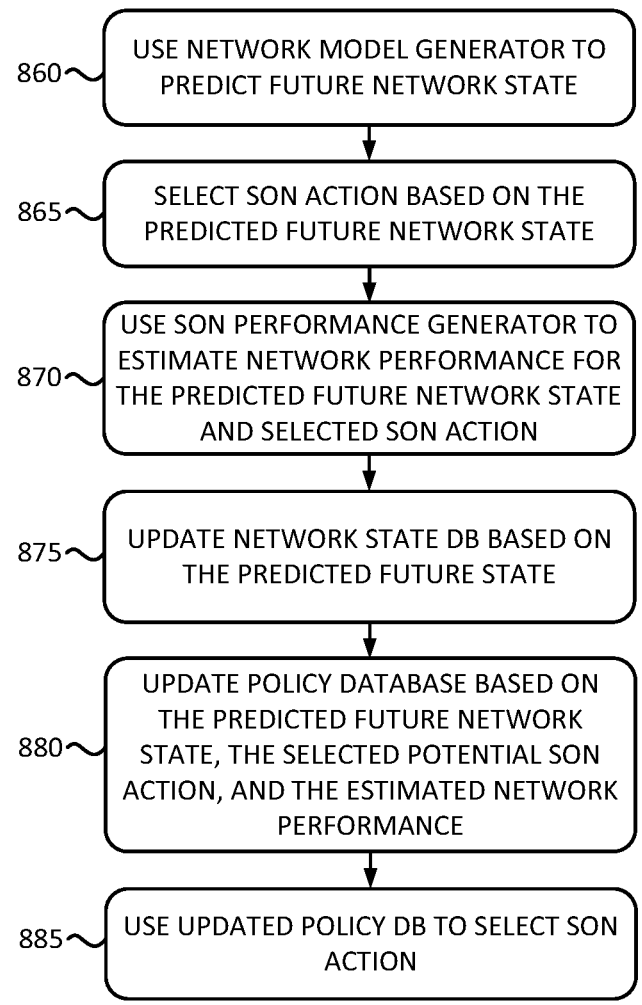
FIG. 8C is a flowchart of a process for applying reinforcement learning to a network entity according to an implementation described herein.

FIGS. 8B and 8C are described together. FIG. 8B is a diagram of a SON reinforcement learning system 802. In some implementations, SON reinforcement learning system 802 may be implemented in SON manager 315. In other implementations, some or all components of SON reinforcement learning system 802 may be implemented in SON system 160. FIG. 8C is a flowchart of a process for applying reinforcement learning to SON system 160 using SON reinforcement learning system 802. In some implementations, the process of FIG. 8C may be performed by one or more cloud center devices 144. In other implementations, some or all of the process of FIG. 8C may be performed by another device or a group of devices separate from the one or more cloud center devices 144, such as SON system 160.

As shown in FIG. 8B, SON reinforcement learning system 802 may include network model generator 820, SON manager 315, network performance generator 630, a policy database (DB) 840, and a network state DB 845.

Network model generator 820 may generate a predicted future network state 825 (block 860 in FIG. 8C). SON manager 315 may, in response to the predicted future network state 825, select a SON action based on information stored in policy DB 840 and network state DB 845 (block 865 in FIG. 8C). Policy DB 840 may include information that relates network states to SON actions and network performance metrics. For example, for a particular network state, policy DB 840 may store one or more SON actions and a predicted network performance if a particular SON action is carried out. Thus, in the language of reinforcement learning, the network states may represent the state of the environment, the SON actions may represent the policy that maps from the environment to agent actions, and the predicted network performance may represent a value function that maximizes reward. Network state DB 845 may store information relating to network states that have been explored by SON manager 315. SON manager 315 may select a SON action 610 from policy DB 840 based on predicted future network state 825. If policy DB 840 does not include an entry for predicted future network state 825, or does not include any SON actions in association with predicted future network state 825, SON manager 315 may select a random SON action to be performed.

Selected SON action 610 and predicted future network state 825 may be provided as input to network performance generator 630 and network performance generator 630 may generate network performance metrics as estimated network performance 850 based on selected SON action 610 and predicted future network state 825 (signal 850 and block 870 in FIG. 8C). SON manager 315 may update network state DB 845 based on predicted future network state 825 (block 875) and estimated network performance 850 may be used to update policy DB 840 based on predicted future network state 825 and selected SON action 610. For example, a record corresponding to predicted future network state 825 may be updated to associated selected SON action 610 with estimated network performance 850.

SON manager 315 may use the updated policy DB 840 to select SON actions in the future (block 885). For example, if predicted future network state 825 arises in the future in a network, SON manager 315 may be able to determine whether SON action 610 will result in satisfactory network performance and thus whether SON action 610 should be selected. In other words, SON manager 315 may be able to select a particular SON action, for a particular network state, which will result in the best estimated network performance.

Figure 9A:
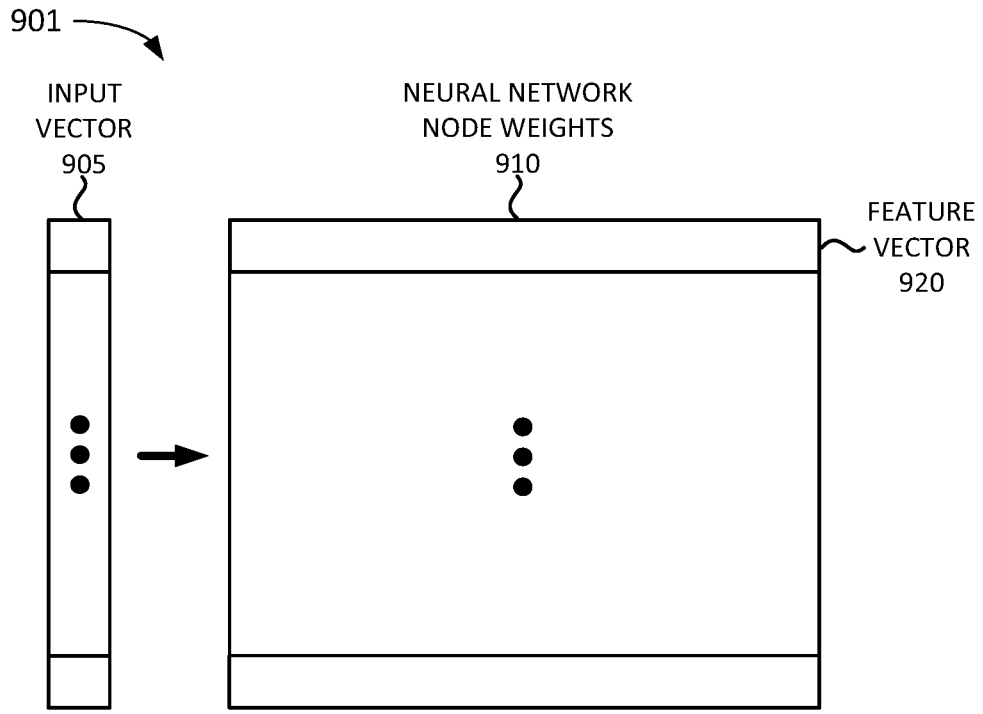
FIGS. 9A-9C are diagrams illustrating system performance space arithmetic based on feature vectors obtained from a generator neural network according to an implementation described herein.
Figures 9B, 9C:
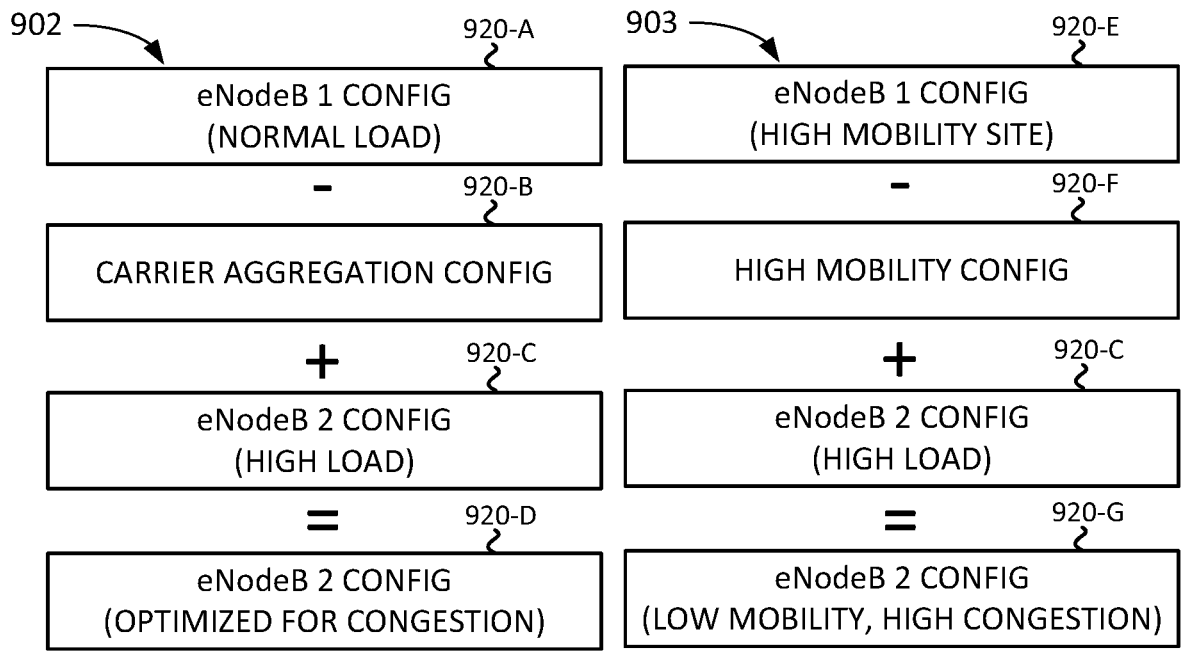

FIGS. 9A-9C are diagrams illustrating system performance space arithmetic based on feature vectors obtained from a generator neural network according to an implementation described herein. FIG. 9A illustrates a representation 901 that includes an input vector 905 and a neural network node weights matrix 910 of the latent space. Input vector 905 may correspond to a particular configuration and workload profile used as input to network performance generator 630. For example, each configuration or workload parameter may correspond to an element of input vector 905, with the element storing a value for configuration or workload parameter. Neural network node weights matric 910 may include the weights associated with trained network performance generator 630. Each row of neural network node weights matrix 910 may correspond to a feature vector 920 associated with a particular configuration or workload parameter and the values of feature vector 920 may correspond to the values of the features for input vector 905.

Thus, the values of feature vector 920 may plot a particular configuration or workload parameter in a high dimensional feature space of configuration and workload parameters. Furthermore, the distance between two feature vectors 920 in the high dimensional feature space may represent how similar the two network configuration vectors are and vector arithmetic may be used to determine relationships between different network configuration vectors.

FIG. 9B illustrates a first exemplary vector arithmetic 902. Assume an eNodeB 1 configuration under normal load corresponds to feature vector 920-A, a carrier aggregation configuration corresponds to feature vector 920-B, and an eNodeB 2 configuration under high load corresponds to feature vector 920-C. Further assume that an optimized configuration for eNodeB 2 under a congestion workload situation is desired. By subtracting feature vector 920-B from feature vector 920-A, and adding feature vector 920-C, feature vector 920-D may be obtained. Feature vector 920-D may be close to the optimized configuration for eNodeB 2 under a congestion workload situation in the feature space.

FIG. 9C illustrates a first exemplary vector arithmetic 903. Assume an eNodeB 1 configuration under a high mobility workload corresponds to feature vector 920-E, a high mobility configuration corresponds to feature vector 920-F, and eNodeB 2 configuration under high load corresponds to feature vector 920-C. Further assume that an optimized configuration for eNodeB 2 under a low mobility and high congestion workload situation is desired. By subtracting feature vector 920-F from feature vector 920-E, and adding feature vector 920-C, feature vector 920-G may be obtained. Feature vector 920-G may be close to the optimized configuration for eNodeB 2 under a low mobility and high congestion workload situation in the feature space.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 4, 5C, 6B, and 8C, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   training, by a computer device, a generative adversarial network (GAN) to generate a network model that predicts future states of a network based on data of previous states of the network, wherein training the GAN to generate the network model that predicts future states of the network based on the data of previous states of the network includes:
      training a generator neural network to simulate future states of the network using a discriminator neural network that discriminates the data of the previous states of the network from the simulated future states of the network;
   using, by the computer device, the GAN to predict a future network state;
   selecting, by the computer device, a self-organizing network (SON) action to perform on the network based on the predicted future network state;
   updating a SON policy database based on at least the predicted future network state and the selected SON action the selected SON action;
   detecting a network state for the network that corresponds to the predicted future network state; and
   performing the selected SON action by applying the selected SON action from the SON policy database to the network, in response to detecting the network state.

2. The method of claim 1, wherein the SON action includes an instruction to adjust at least one of:
   a coverage optimization parameter,
   a capacity optimization parameter,
   a handover parameter,
   a neighbor list parameter,
   an antenna tilt parameter,
   a delay optimization parameter,
   a carrier optimization parameter, or
   a random access channel parameter.

3. The method of claim 1, further comprising:
   using a network performance generator neural network to estimate network performance of the network for the predicted future state and based on the selected SON action.

4. The method of claim 3, further comprising:
   training the network performance generator neural network to generate a network performance metric using a network performance discriminator neural network that discriminates output generated by the network performance generator neural network from network performance metrics generated by a plurality of generator neural networks trained to simulate virtualized network function (VNF) managed objects (MOs) associated with the network.

5. The method of claim 3, further comprising:
   determining that the estimated network performance of the network for the predicted future state and the selected SON action satisfies a network performance requirement for the network; and wherein performing the selected SON action includes
applying the selected SON action to the network, in
response to determining that the calculated network
performance metric satisfies the network performance
requirement for the network.

6. The method of claim 5, wherein updating the SON policy database is further based on the estimated network performance.

7. The method of claim 6, further comprising:
detecting a network state for the network;
determining that no SON action is stored in the SON policy database in connection with the detected network state for the network;
selecting a random SON action, in response to determining that no SON action is stored in the SON policy database in connection with the detected network state for the network; and
using the network performance generator neural network to estimate network performance of the network for the detected network state and the selected random SON action.

8. A device comprising:
a processor configured to execute instructions to:
train a generative adversarial network (GAN) to generate a network model that predicts future states of a network based on data of previous states of the network, wherein, when training the GAN to generate the network model that predicts future states of the network based on the data of previous states of the network, the processor is further configured to:
train a generator neural network to simulate future states of the network using a discriminator neural network that discriminates the data of the previous states of the network from the simulated future states of the network;
use the GAN to predict a future network state;
select a self-organizing network (SON) action to perform on the network based on the predicted future network state;
update a SON policy database based on at least the predicted future network state and the selected SON action the selected SON action;
detect a network state for the network that corresponds to the predicted future network state; and
perform the selected SON action by configuring the processor to apply the selected SON action from the SON policy database to the network, in response to detecting the network state.

9. The device of claim 8, wherein the SON action includes an instruction to adjust at least one of:
a coverage optimization parameter,
a capacity optimization parameter,
a handover parameter,
a neighbor list parameter,
an antenna tilt parameter,
a delay optimization parameter,
a carrier optimization parameter, or
a random access channel parameter.

10. The device of claim 8, wherein the processor is further configured to:
use a network performance generator neural network to estimate network performance of the network for the predicted future state and the selected SON action.

11. The device of claim 10, wherein the processor is further configured to:
train the network performance generator neural network to generate a network performance metric using a network performance discriminator neural network that discriminates output generated by the network performance generator neural network from network performance metrics generated by a plurality of generator neural networks trained to simulate virtualized network function (VNF) managed objects (MOs) associated with the network.

12. The device of claim 10, wherein the processor is further configured to:
determine that the estimated network performance of the network for the predicted future state and the selected SON action satisfies a network performance requirement for the network; and
wherein, when performing the selected SON action, the processor is configured to apply the selected SON action to the network, in response to determining that the calculated network performance metric satisfies the network performance requirement for the network.

13. The device of claim 12, wherein the processor is further configured to:
update the SON policy database based on the estimated network performance.

14. The device of claim 13, wherein the processor is further configured to:
detect a network state for the network;
determine that no SON action is stored in the SON policy database in connection with the detected network state for the network;
select a random SON action, in response to determining that no SON action is stored in the SON policy database in connection with the detected network state for the network; and
use the network performance generator neural network to estimate network performance of the network for the detected network state and the selected random SON action.

15. A system comprising:
a first device configured to:
train a generative adversarial network (GAN) to generate a network model that predicts future states of a network based on data of previous states of the network, wherein, when training the GAN to generate the network model that predicts future states of the network based on the data of previous states of the network, the processor is further configured to:
train a generator neural network to simulate future states of the network using a discriminator neural network that discriminates the data of the previous states of the network from the simulated future states of the network; and
use the GAN to predict a future network state; and
a second device configured to:
select a self-organizing network (SON) action to perform on the network based on the predicted future network state;
update a SON policy database based on at least the predicted future network state and the selected SON action the selected SON action;
detect a network state for the network that corresponds to the predicted future network state; and
perform the selected SON action by applying the selected SON action from the SON policy database to a network device in the network, in response to detecting the network state.

16. The system of claim 15, wherein the SON action includes an instruction to adjust at least one of:
a coverage optimization parameter, a capacity optimization parameter,
a handover parameter,
a neighbor list parameter,
an antenna tilt parameter,
a delay optimization parameter,
a carrier optimization parameter, or
a random access channel parameter.

17. The system of claim 15, wherein the first device is further configured to:
   train the network performance generator neural network to generate a network performance metric using a network performance discriminator neural network that discriminates output generated by the network performance generator neural network from network performance metrics generated by a plurality of generator neural networks trained to simulate virtualized network function (VNF) managed objects (MOs) associated with the network.

18. The system of claim 17, wherein the first device is further configured to:
   determine that the estimated network performance of the network for the predicted future state and the selected SON action satisfies a network performance requirement for the network; and
   instruct the second device to apply the selected SON action to the network, in response to determining that the calculated network performance metric satisfies the network performance requirement for the network.

19. The system of claim 15, wherein the second device is further configured to update the SON policy database based on the estimated network performance.

20. The system of claim 19, wherein the second device is further configured to:
   detect a network state for the network;
   determine that no SON action is stored in the SON policy database in connection with the detected network state for the network;
   select a random SON action, in response to determining that no SON action is stored in the SON policy database in connection with the detected network state for the network; and
   use the network performance generator neural network to estimate network performance of the network for the detected network state and the selected random SON action.

\* \* \* \* \*